US012669356B2

(12) United States Patent
Jonsson

(10) Patent No.: US 12,669,356 B2
(45) Date of Patent: Jun. 30, 2026

(54) MULTI-HOLE PRESSURE PROBE AND USE OF SUCH A PROBE

(71) Applicant: ISAK JONSSON AB, Svenstavik (SE)

(72) Inventor: Isak Jonsson, Lidingo (SE)

(73) Assignee: ISAK JONSSON AB, Svenstavik (SE)

( * ) Notice: Subject to any disclaimer, the term of this patent is extended or adjusted under 35 U.S.C. 154(b) by 290 days.

(21) Appl. No.: 18/560,216

(22) PCT Filed: May 10, 2022

(86) PCT No.: PCT/SE2022/050456
    § 371 (c)(1),
    (2) Date: Nov. 10, 2023

(87) PCT Pub. No.: WO2022/240342
    PCT Pub. Date: Nov. 17, 2022

(65) Prior Publication Data
    US 2024/0240978 A1     Jul. 18, 2024

(30) Foreign Application Priority Data
    May 12, 2021    (SE) .................................. 2150612-6

(51) Int. Cl.
    *G01F 1/46*         (2006.01)
    *G01P 5/16*         (2006.01)
    (Continued)

(52) U.S. Cl.
    CPC .................. *G01F 1/46* (2013.01); *G01P 5/16*
    (2013.01); *G01P 5/165* (2013.01); *G01P*
    *13/025* (2013.01)

(58) Field of Classification Search
    CPC ...... G01P 1/26; G01P 5/14; G01P 5/16; G01P
    5/165; G01P 13/0066; G01P 13/025;
    G01F 1/46
    See application file for complete search history.

(56) References Cited

U.S. PATENT DOCUMENTS

| | | | | |
|---|---|---|---|---|
| 4,718,273 A | * | 1/1988 | McCormack | ....... G01L 19/0007 |
| | | | | 73/180 |
| 5,797,105 A | | 8/1998 | Nakaya et al. | |

(Continued)

FOREIGN PATENT DOCUMENTS

| | | |
|---|---|---|
| JP | H10115535 A | 5/1998 |
| WO | 2006056029 A2 | 6/2006 |

OTHER PUBLICATIONS

International Search Report and Written Opinion issued in corresponding International Application No. PCT/SE2022/050456 mailed May 27, 2022.

*Primary Examiner* — Justin N Olamit
(74) *Attorney, Agent, or Firm* — Burr & Forman

(57)         ABSTRACT

A multi-hole pressure probe (110) for measuring the pressure, flow speed, and/or flow direction of a fluid comprises: a probe tip (12) provided with a main channel inlet port (14) facing in an upstream direction and having an outer probe tip surface (32) adjacent to said main channel inlet port (14); a main channel (36) extending from the main channel inlet port (14) and being defined by a main channel inner wall (38); a stagnation pressure probing port (42) arranged within the main channel (36), downstream of, and facing, the main channel inlet port (14), the stagnation pressure probing port (42) being connected to a stagnation pressure probing channel (18); and a set of side ports (16a-d) in the outer probe tip surface (32), the side ports (16a-d) being connected to respective side port probing channels (20a-d), wherein the main channel inner wall (38) has a convergent section (44) extending in the downstream direction from the main channel inlet port (14).

19 Claims, 12 Drawing Sheets

(51) Int. Cl.
     *G01P 5/165*          (2006.01)
     *G01P 13/02*         (2006.01)

(56)                References Cited

U.S. PATENT DOCUMENTS

| | | | | |
|---|---|---|---|---|
| 7,480,548 | B2 | 1/2009 | Shigemi et al. | |
| 8,863,590 | B2 * | 10/2014 | Watkins | G01L 7/00 |
| | | | | 73/866.5 |
| 9,027,392 | B2 * | 5/2015 | Vander Hoek | G01M 15/14 |
| | | | | 73/754 |
| 9,541,429 | B2 * | 1/2017 | Farokhi | G01K 13/02 |
| 11,035,874 | B2 * | 6/2021 | Garrood | G01P 13/045 |
| 2005/0011285 | A1 | 1/2005 | Giterman | |
| 2023/0408543 | A1 * | 12/2023 | Feichtinger | G01P 5/165 |

* cited by examiner

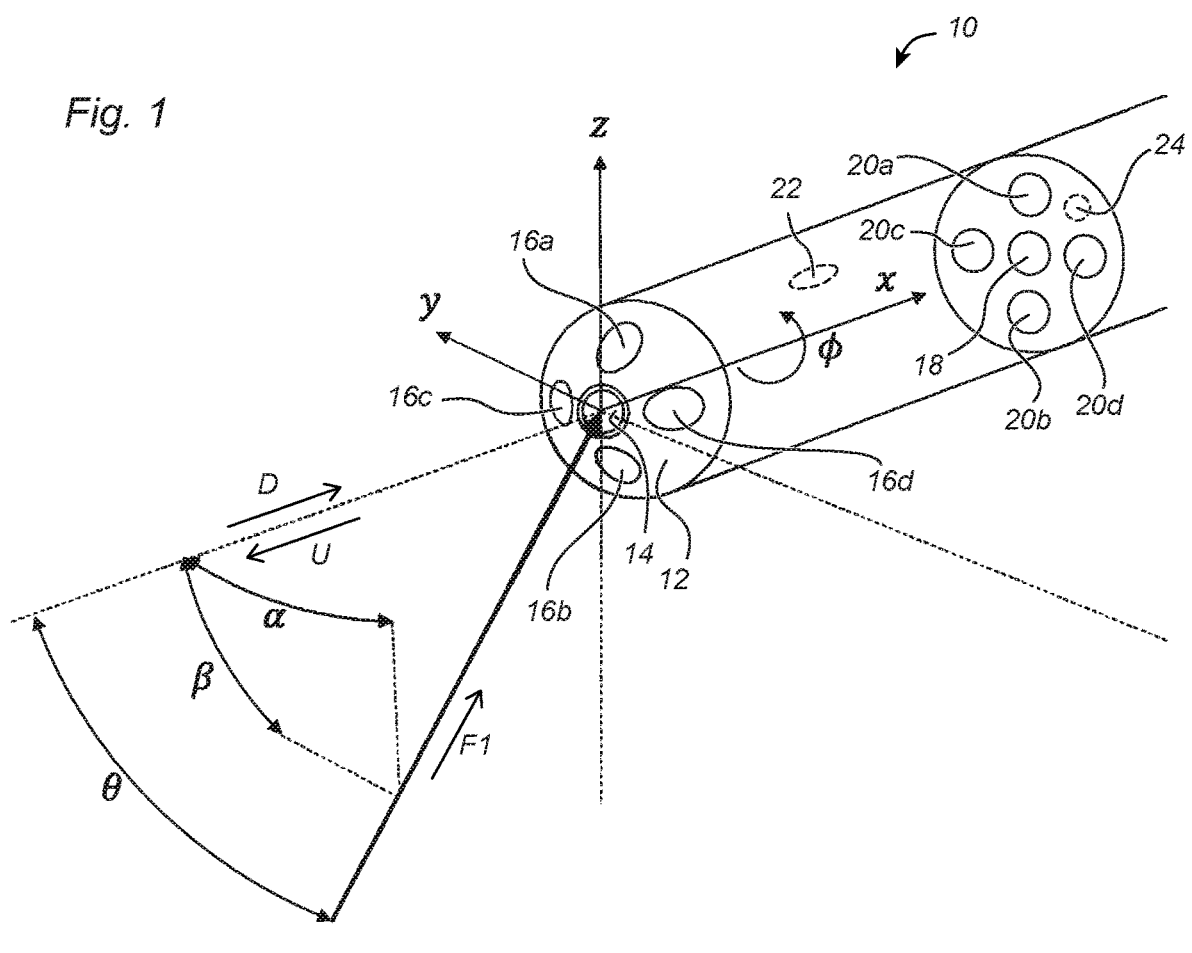
*Fig. 1*
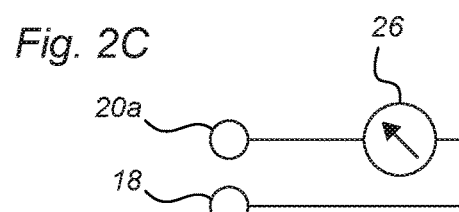
*Fig. 2A*
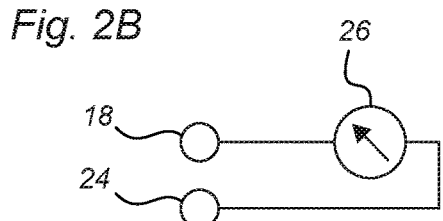
*Fig. 2B*
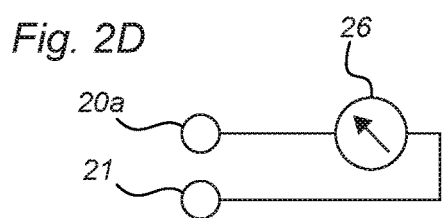
*Fig. 2C*
*Fig. 2D*
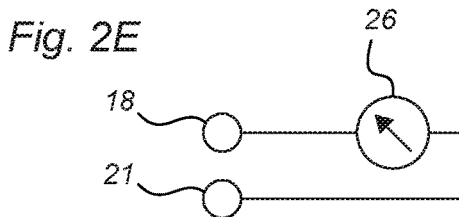
*Fig. 2E*
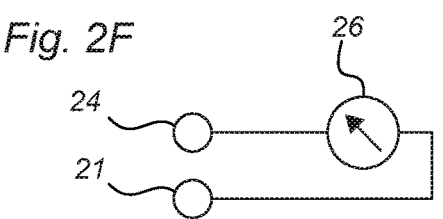
*Fig. 2F*

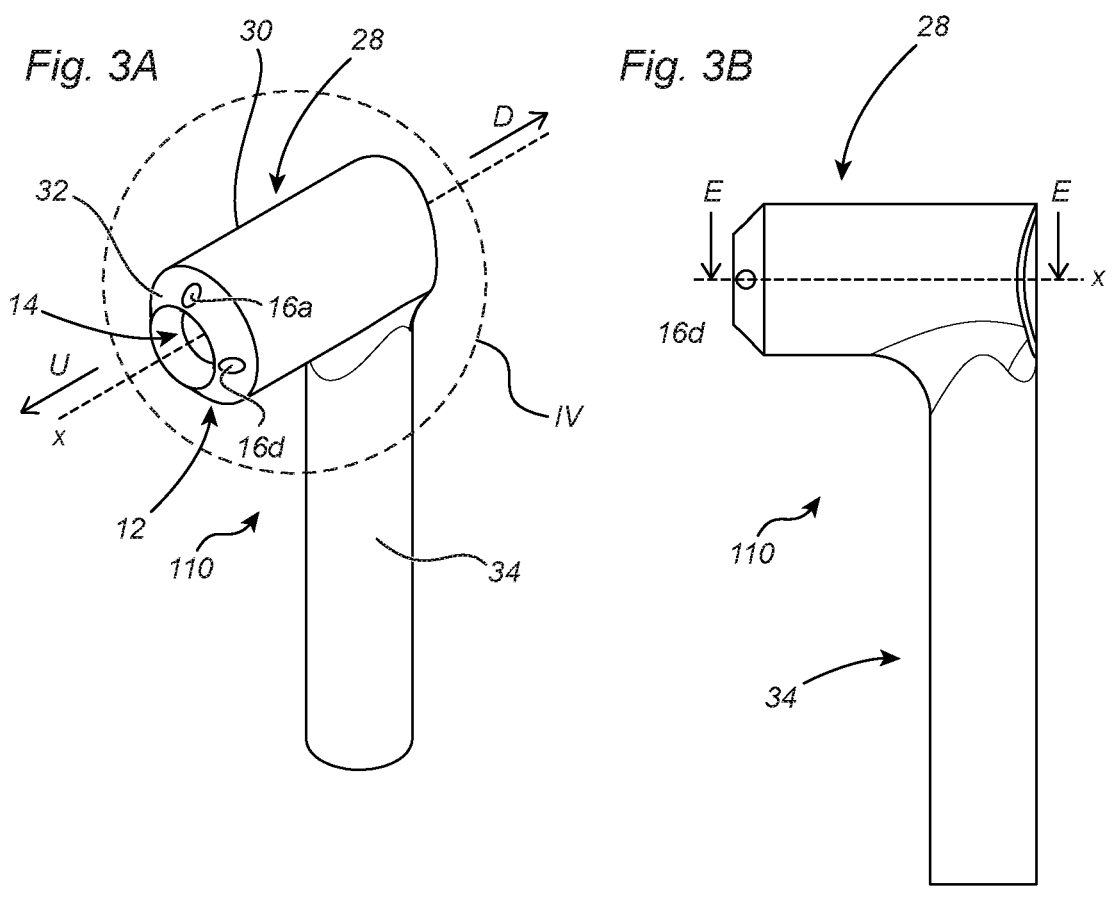
*Fig. 3A*
*Fig. 3B*
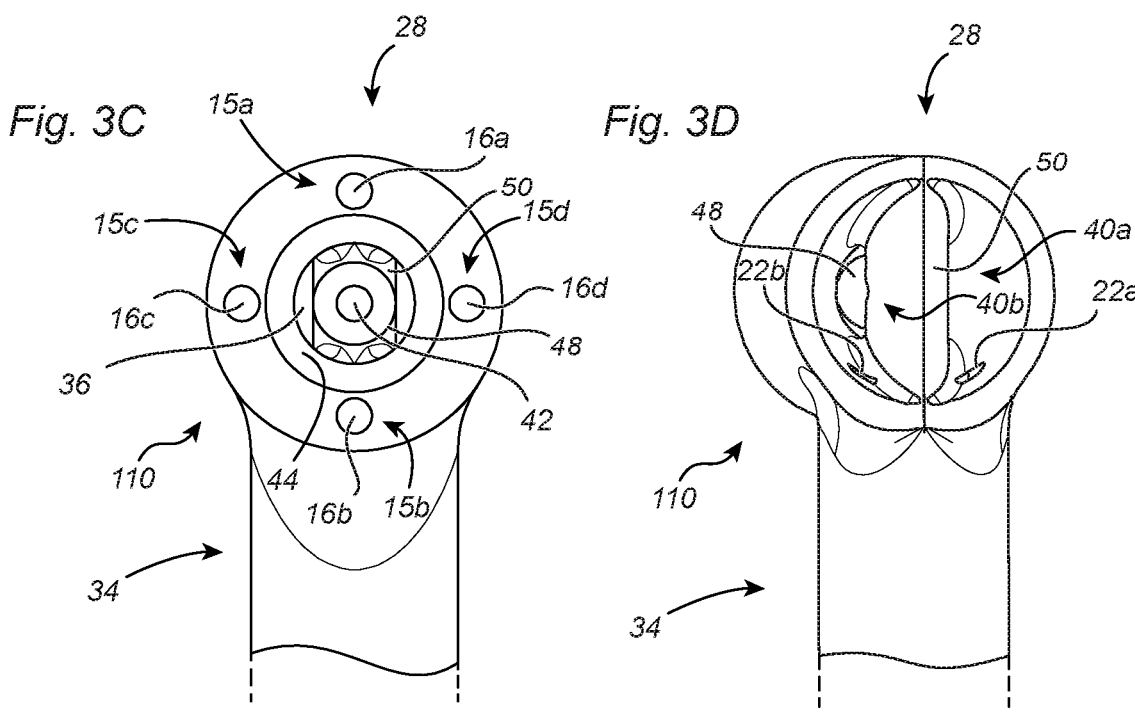
*Fig. 3C*
*Fig. 3D*

MULTI-HOLE PRESSURE PROBE AND USE OF SUCH A PROBE

FIELD OF THE INVENTION

The present invention relates to a multi-hole pressure probe for measuring the pressure, flow speed and/or flow direction of a fluid. The invention also relates to methods of determining flow angle and speed, and to the use of such a probe for determining the flow direction, flow speed, and/or pressure of a fluid in turbomachinery.

BACKGROUND

U.S. Pat. No. 7,480,548 B2 discloses a truncated pyramid-shape multi-hole Pitot probe intended for aviation purposes. According to U.S. Pat. No. 7,480,548 B2, the flight velocity vector is calculated based on a calibration function making use of the respective pressures of each of the ports of the multi-hole probe. Other applications may pose requirements that the suggested probe does not meet on a satisfactory level. For example, there is a need for a probe enabling three-dimensional fluid flow measurements in turbo machinery. Angle sensitivity, size, accuracy, and cumbersome calibration procedures pose various difficulties in various respective flow measurement applications. Hence, there is a need for an improved probe addressing some or all of the above issues.

SUMMARY

It is an object of the present invention to solve, or at least mitigate, parts or all of the above mentioned problems. To this end, according to a first concept, there is provided a multi-hole pressure probe for measuring the pressure, flow speed, and/or flow direction of a fluid, the multi-hole pressure probe extending along a longitudinal axis and comprising: a probe tip provided with a main channel inlet port facing in an upstream direction along the longitudinal axis, the probe tip having an outer probe tip surface adjacent to said main channel inlet port; a main channel connected to said main channel inlet port, the main channel extending from the main channel inlet port in a downstream direction, opposite to the upstream direction, and being defined by a main channel inner wall; a stagnation pressure probing port arranged within the main channel, downstream of the main channel inlet port, and facing the main channel inlet port in the upstream direction, the stagnation pressure probing port being connected to a stagnation pressure probing channel; and a set of side port arrangements in the outer probe tip surface, each of said side port arrangements being connected to a respective side port probing channel, wherein the main channel inner wall has a convergent section extending in the downstream direction from the main channel inlet port. Such a pressure probe enables accurately detecting pressure over a wider range of the angle of attack between the probe's longitudinal axis and the flow direction of the fluid. Herein, convergent should be construed as having a decreasing cross-sectional area, such that the convergent section of the main channel has a cross-sectional area which is reduced in the downstream direction. The stagnation pressure probing port may be arranged centrally within the main channel, as seen in a cross-section perpendicular to the longitudinal axis. The stagnation pressure probing channel may be configured to be connected to a pressure meter for measuring a stagnation pressure in the stagnation pressure probing channel. Similarly, the side port probing channels may be configured to be connected to one or several pressure meters for determination of at least one of a yaw angle and a pitch angle between the longitudinal axis of the probe and the flow direction of the fluid flow. Typically, the set of side port arrangements may comprise at least two side port arrangements for determination of one of a yaw angle and a pitch angle, or at least four side port arrangements for determination of both the yaw angle and the pitch angle. Each side port arrangement may comprise one or several probing apertures connected to the respective side port probe channel. According to embodiments, the main channel inlet port may have a main channel inlet port width which is at least twice the width of the stagnation pressure probing port. Alternatively or additionally, according to embodiments, the main channel inlet port may have a cross-sectional area, perpendicular to the longitudinal axis, which is at least 50% larger than the cross-sectional area of the main channel 36 at, or immediately upstream of, the longitudinal position of the stagnation pressure probing port. Alternatively or additionally, according to embodiments, the convergent section may have a cross-sectional area which decreases gradually, i.e. without any steps, in the downstream direction.

According to embodiments, the outer probe tip surface may taper towards said main channel inlet port. Positioning the set of side port arrangements in the tapering of the outer probe tip surface enables accurate detection of the pitch and/or yaw angle(s) over a higher range of angle of attack between the probe's longitudinal axis and the direction of the fluid flow. The side port arrangements may be distributed around the longitudinal axis such that different side port arrangements will face in different directions. The outer probe tip surface may, by way of example, have the shape of a frustum of a cone or a dome. According to embodiments, each of said side port arrangements may be located in a probe tip surface which forms an angle of more than 10 degrees with the longitudinal axis, and more typically, in a probe tip surface which forms an angle of between 20 and 60 degrees with the longitudinal axis.

According to embodiments, the stagnation pressure probing port may have a stagnation pressure probing port width, and a longitudinal distance from the main channel inlet port to the stagnation pressure probing port may exceed the stagnation pressure probing port width. According to embodiments, the longitudinal distance from the main channel inlet port to the stagnation pressure probing port may be e.g. between 1 and 10 stagnation pressure probing port widths, and even more advantageously, between 2 and 5 stagnation pressure probing port widths.

According to embodiments, the stagnation pressure probing port may be positioned in a free end of a stagnation pressure probing channel pipe 48. The stagnation pressure probing channel pipe may have an outer mantle face which tapers in the upstream direction. Advantageously, a cross-sectional area of a first, downstream section of the mantle face may be at least 10% larger than a cross-sectional area of a second section of the mantle face upstream of said first, downstream section. According to further embodiments, the cross-sectional area of the first, downstream section of the mantle face may be more than 25%, more than 50%, or more than 100% larger than a cross-sectional area of the second section of the mantle face upstream of said first, downstream section.

According to embodiments, the main channel inner wall may have a divergent section downstream of the convergent section. Herein, divergent should be construed as having an increasing cross-sectional area, such that the divergent section of the main channel has cross-sectional area which expands in the downstream direction. The divergent section expands the fluid flow downstream of the convergent section, which improves alignment of the fluid flow with the longitudinal axis, and even further increases the pressure probe's useful range of angle of attack between the probe's longitudinal axis and the flow direction of the fluid. The stagnation pressure probing port may be arranged at a longitudinal position upstream of the divergent section. According to embodiments, the divergent section may have a cross-sectional area which increases gradually, i.e. without any steps, in the downstream direction. According to embodiments, the main channel inner wall may have a parallel section between the convergent section and the divergent section. Such a configuration even further increases the pressure probe's useful range of angle of attack between the probe's longitudinal axis and the flow direction of the fluid. According to further such embodiments, the stagnation pressure probing port may be arranged at the parallel section or upstream of the parallel section. Having the stagnation pressure probing port at the parallel section is particularly suitable for pressure probing in relatively low fluid speeds, whereas having the stagnation pressure probing port upstream of the parallel section may be suitable for pressure probing in relatively high fluid speeds.

According to embodiments, the convergent section may flare in the upstream direction following a gradually increasing cone angle.

According to embodiments, the multi-hole pressure probe may, at the longitudinal position of the stagnation pressure probing port, have an outer width of less than 10 mm. According to further embodiments, the multi-hole pressure probe may have an outer width of less than 6 mm, or less than 4 mm, at the longitudinal position of the stagnation pressure probing port. For a multi-hole pressure probe having a circular-cylindrical outer shape, the outer width corresponds to the outer diameter.

According to embodiments, each of said side port arrangements may comprise exactly one probing aperture.

According to embodiments, at least a portion of the stagnation pressure probing channel may be defined by a cylindrical wall extending along the longitudinal axis to the stagnation pressure probing port. By having the cylindrical wall of the stagnation pressure probing channel extending all the way up to the stagnation pressure probing port, the stagnation pressure probing port will not flare, which results in a more accurate reading of the stagnation pressure. The cylindrical wall of the stagnation pressure probing channel may be circular-cylindrical, or define a stagnation pressure probing channel having any other suitable cross-sectional shape.

According to embodiments, the multi-hole pressure probe may further comprise at least one main channel outlet downstream of the main channel inlet port. Such an arrangement improves the alignment of the fluid flow along the longitudinal axis at the position of the stagnation pressure probing port, which enables an even wider range of the angle of attack between the probe's longitudinal axis and the flow direction of the fluid with maintained or improved measurement accuracy. The at least one main channel outlet may comprise a plurality of main channel outlets, for example two, three or four main channel outlets. According to further embodiments, the at least one main channel outlet is positioned downstream of the stagnation pressure probing port. According to some embodiments, the at least one main channel outlet may be provided on an outer probe surface parallel to the longitudinal axis. Multiple main channel outlets may be distributed about the longitudinal axis of the probe. Optionally, the at least one main channel outlet may be elongate, wherein the longitudinal direction of the elongate main channel outlet(s) extends along the longitudinal axis of the probe.

According to embodiments, the multi-hole pressure probe may further comprise at least one static pressure probing port connected to a static pressure probing channel. The static pressure probing channel may be configured to transfer the static pressure to a pressure meter. The at least one static pressure probing port may comprise a plurality of static pressure probing ports distributed circumferentially about the longitudinal axis. Optionally, all such static pressure probing ports may be arranged at the same longitudinal position. Each static pressure probing port may be connected to a respective static pressure probing channel.

According to embodiments, the at least one static pressure probing port may be arranged in the main channel between the main channel inlet port and the main channel outlet, for probing the static pressure in the main channel. Internal static pressure probing port(s) within the main channel may enable, in comparison to external static pressure probing ports on the outer surface of the probe, accurate measurement of the static pressure over a wider range of the angle of attack between the probe's longitudinal axis and the flow direction of the fluid.

Advantageously, the at least one static pressure probing port may be arranged downstream of the convergent section.

According to embodiments, the at least one static pressure probing port may be arranged at the parallel section of the main channel.

According to embodiments, the probe tip surface may have a circular cross-section in a plane perpendicular to the longitudinal axis. The symmetry of a circular outer shape may be particularly well suited for probing fully three-dimensional fluid flows.

According to embodiments, the outer probe tip surface may have the shape of a frustum of a pyramid or a frustum of a circular cone.

According to embodiments, the multi-hole pressure probe may have a circular-cylindrical body extending downstream of the probe tip.

According to embodiments, the multi-hole pressure probe may comprise a probe body extending along the longitudinal axis, and a probe suspension arm extending from the probe body transversal to the longitudinal axis, the probe suspension arm comprising the probing channels. Any main channel outlet may be provided at a downstream end face of the probe body, and may face in the downstream direction. The probe suspension arm may be connected to the probe body at a downstream end of the probe body.

According to embodiments, the multi-hole pressure probe may be integrally formed as a single piece of material. Such a multi-hole pressure probe may be conveniently obtained by e.g. additive manufacturing. According to embodiments, the material may be metal, such as stainless steel or a titanium-based alloy. Such an integrally formed metal probe may be obtained by sintering of metallic powder, for example by selective laser sintering, or sintering a blank obtained by an additive method such as binder jetting.

According to a second concept, there is provided a pressure probe for measuring the speed of a fluid, the pressure probe extending along a longitudinal axis and comprising: a probe tip provided with a main channel inlet port facing in an upstream direction along the longitudinal axis; a main channel connected to said main channel inlet port, the main channel extending from the main channel inlet port in a downstream direction, opposite to the upstream direction, and being defined by a main channel inner wall; a stagnation pressure probing port arranged within the main channel, downstream of the main channel inlet port, and facing the main channel inlet port in the upstream direction, the stagnation pressure probing port being connected to a stagnation pressure probing channel; at least one main channel outlet downstream of the main channel inlet port; and a set of static pressure probing ports distributed around the longitudinal axis, each of said static pressure probing ports being connected to a static pressure probing channel, wherein said static pressure probing ports are arranged in the main channel between the main channel inlet port and the main channel outlet, for probing the static pressure in the main channel. The static pressure probing ports may be connected to the same, single static pressure probing channel, or to different respective static pressure probing channels. Similar to the pressure probe defined hereinabove according to the first concept, also the pressure probe according to the second concept may be a multi-hole pressure probe having an outer probe tip surface adjacent to said main channel inlet port and a set of side port arrangements in the outer probe tip surface, each of said side port arrangement being connected to a respective side port probing channel. The various embodiments and features described hereinabove with reference to the pressure probe according to the first concept are individually applicable also to the pressure probe according to the second concept.

A method of determining a flow angle using a probe as defined hereinabove may comprise detecting a differential pressure between a first side port probing channel and at least one of the stagnation pressure probing channel and a second side port probing channel. Thereby, a high measurement accuracy of the flow angle may be maintained over a large angle range.

A method of determining a flow speed using a probe as defined hereinabove may comprise detecting a differential pressure between the stagnation pressure probing channel and a reference pressure source; and calculating the flow speed at least mainly based on the detected differential pressure. By omitting or at least substantially omitting any pressure readings from the side ports, the cone angle dependency of the flow speed measurement is reduced, which enables accurate fluid speed measurements over a large cone angle range.

Any of the probes or methods defined hereinabove may be used for determining the flow direction, flow speed, and/or pressure of a fluid in e.g. turbomachinery. Changes in flow direction, velocity and pressure in turbomachinery are directly related to the efficiency of the turbomachinery. An accurate knowledge of those flow properties is therefore very useful. Accurate measurement of fluid flows within such machinery poses particular difficulties. For example, the fluid flow may follow complex three-dimensional flow paths, flow angle ranges may be large, fluid speeds may be high, and the available space for mounting probes may be highly limited. An example of a piece of turbomachinery that may benefit from the pressure probes defined herein is a gas turbine.

It is noted that embodiments of the invention may be embodied by all possible combinations of features recited in the claims, as well as all possible combinations of the features of the specific embodiments defined hereinabove. Further, it will be appreciated that the various embodiments described for the probe of the first concept are all combinable with the probe defined in accordance with the second concept, and vice versa. Moreover, the various embodiments described for the probes are combinable with the methods defined hereinabove.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1 is a perspective view of a highly schematic representation of an upstream end of a multi-hole probe in a reference coordinate system;

FIG. 2A is a functional block diagram illustrating a first connection arrangement for differential pressure detection using the multi-hole probe of FIG. 1;

FIG. 2B is a functional block diagram illustrating a second connection arrangement for differential pressure detection using the multi-hole probe of FIG. 1;

FIG. 2C is a functional block diagram illustrating a third connection arrangement for differential pressure detection using the multi-hole probe of FIG. 1;

FIG. 2D is a functional block diagram illustrating a fourth connection arrangement for differential pressure detection using the multi-hole probe of FIG. 1;

FIG. 2E is a functional block diagram illustrating a fifth connection arrangement for differential pressure detection using the multi-hole probe of FIG. 1;

FIG. 2F is a functional block diagram illustrating a sixth connection arrangement for differential pressure detection using the multi-hole probe of FIG. 1;

FIG. 3A is a perspective view of the schematic multi-hole probe of FIG. 1 according to a first embodiment;

FIG. 3B is a side view of the multi-hole probe of FIG. 3A;

FIG. 3C is a front view of a top portion of the multi-hole probe of FIG. 3A;

FIG. 3D is a view of the top portion of the probe of FIG. 3C as seen obliquely from the rear;

Figure 3E:
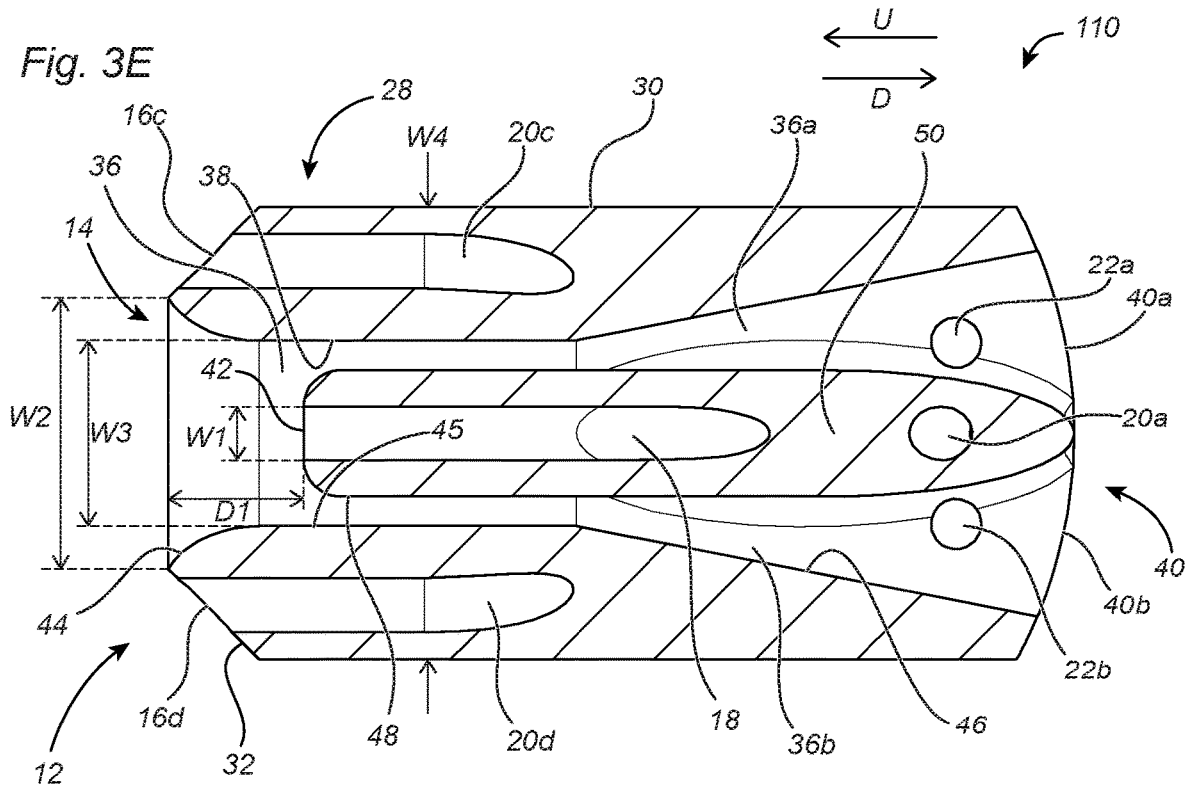
FIG. 3E illustrates a section of the probe of FIGS. 3A-3D, the section taken along the line E-E of FIG. 3B.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

FIG. 1 defines the overall geometric reference system of a multi-hole pressure probe 10 extending along a longitudinal axis x, and illustrates a probe tip 12 of the multi-hole pressure probe 10. The multi-hole pressure probe 10 is positioned in the flow of a fluid which moves at least partly along the general direction of the longitudinal axis x, i.e. the flow direction F1 of the fluid has at least a component extending parallel to the longitudinal axis x. In the following, the multi-hole pressure probe 10 will, for the sake of simplicity, be more briefly referred to simply as "the probe" 10. The probe tip 12 comprises a main channel inlet port 14 facing in an upstream direction U along the longitudinal axis x, and a set of side ports comprising a first side port 16a, a second side port 16b, a third side port 16c, and a fourth side port 16d surrounding the main channel inlet port 14 in a symmetric manner. The side ports 16a-16d are configured to probe respective side port pressures $p_a$, $p_b$, $p_c$, $p_d$ at circumferential positions about the main channel inlet port 14. A central stagnation pressure probing port (not illustrated), for probing a stagnation pressure $p_t$, is arranged within the main channel, downstream of the main channel inlet port 14, and likewise faces in the upstream direction U. The stagnation pressure probing port is connected to a stagnation pressure probing channel 18, and each of the side ports is connected to a respective side port probing channel 20a, 20b, 20c, 20d.

The probe 10 may further comprise one or several static pressure probing ports 22, which may be connected to a static pressure probing channel 24, for probing the static pressure $p_s$ at the probe 10. The shape of the probe tip 12 and the number of ports may vary depending on the type of probe.

FIG. 1 illustrates the probe 10 anchored to two interchangeable coordinate systems. The coordinate systems may be used for defining direction F1 of the flow in relation to the longitudinal axis x of the probe 10. The first ($\alpha$-$\beta$) coordinate system defines the angle components $\alpha$ and $\beta$ of the fluid flow in the respective x-y and x-z planes in Cartesian coordinates x, y, z, with the x-axis coinciding with the longitudinal axis of the probe, and the centre of the main channel inlet port 14 at the origin. The angles $\alpha$ and $\beta$ may be referred to as the yaw and pitch, respectively, of the fluid flow. The flow is parallel to the probe 10 when both $\alpha$ and $\beta$ are zero. The second ($\theta$-$\phi$) coordinate system defines the angle $\theta$ between the longitudinal/x-axis and the flow, along with the angle $\phi$ about the longitudinal/x-axis. The angles $\phi$ and $\theta$ may be referred to as the roll, and the cone angle or angle of attack, respectively. At parallel flow, the roll angle $\phi$ becomes undefined whilst the cone angle $\theta$ is zero.

A multi-hole pressure probe 10 can either be used in a nulling mode or a non-nulling mode. The latter is also known as the calibrated mode. The nulling mode is based on finding a set ratio between the ports by orienting the probe in the flow. While this may be suitable for relatively simple flow measurements, it may be unsuitable due to the character of the flow, or impossible due to e.g. space constraints. In the non-nulling mode, the probe 10 is initially calibrated. This is achieved by traversing the probe 10 in a known calibration flow field for a wide set of flow angles, and reading the pressures in the probing ports via the probing channels. The pressure readings from the ports of the probe are typically reduced to dimensionless pressure coefficients, representing the ratios between port pressures, which ratios are correlated to the calibration flow field. These coefficients are eventually applied to the pressure readings when the probe 10 is inserted into an unknown flow field. The basic operation principle of the side ports 16a-16d may be as follows: As the probe 10 is inclined in the flow field, the probe surface on the windward side will perceive a large share of stagnation pressure while the surface of leeward side will perceive a reduced stagnation pressure. Measuring the relation of the pressures in these ports yields a measure for the roll and cone angles $\phi$, $\theta$, and the total as well as the dynamic pressure of the flow.

FIGS. 2A, 2B, 2C, 2D, 2E and 2F are generic illustrations of exemplary measurements of the pressures in the probing channels 18, 20a-d, 24 of the multi-hole pressure probe 10 of FIG. 1. For example, as illustrated in the view of FIG. 2A, the pitch p may be determined by connecting a pressure gauge 26 to detect the pressure difference between the first and second side port probing channels 20a, 20b. Similarly, the yaw $\alpha$ may be determined by connecting a pressure gauge 26 to detect the pressure difference between the third and fourth side port probing channels 20c, 20d. The differential measurement of FIG. 2A works well for low flow speeds and/or small cone angles $\theta$ (in the particular example of the first and second side ports 20a, 20b: a small angle $\beta$), where there is no flow separation on the leeward side of the probe 10.

FIG. 2B illustrates an exemplary detection of the dynamic pressure generated by the fluid flow by detecting the pressure difference between the stagnation pressure probing channel 18 and the static pressure probing channel 24.

Alternatively or additionally, also the side port probing channels 20a-d may be differentially connected to the static pressure probing channel 24 in the manner illustrated in FIG. 2B.

FIG. 2C illustrates an exemplary detection of the pressure generated by the fluid flow in the first side port probing channel 20a by detecting the pressure difference between the first side port probing channel 20a and the stagnation pressure probing channel 18. It will be appreciated that also the other side port probing channels 20b-d may be differentially connected to the stagnation pressure probing channel 18 in the same manner. Using the differential detection configuration of FIG. 2C, detection of the pressure in the side ports on the windward side of the probe 10 typically remains accurate at larger cone angles θ than by using the configuration of FIG. 2A, since the detection is not as sensitive to flow separation on the leeward side. Moreover, by using a probe 10 designed according to the general teachings herein, the stagnation pressure detection of FIG. 2C remains reliable over a relatively large cone angle range. Hence, for moderate to relatively large cone angles θ, the differential measurement of FIG. 2C may be beneficial compared to e.g. that of FIG. 2A. Still further, the relative error $\varepsilon_a$ in the detection of the side port pressure $p_a$ is proportional to the detected pressure difference Δp between the respective differentially connected probing channels, in this case the side port probing channel 20a and the stagnation pressure probing channel 18:

$$\varepsilon_a = c \, \Delta p$$

Thereby, compared to the differential detection between a side port probing channel 20a and the static pressure probing channel 24 as described above with reference to FIG. 2B, the differential detection of FIG. 2C generates a smaller pressure difference Δp, resulting in a smaller error $\varepsilon_a$, wherein the benefit of the setup of FIG. 2C increases, compared to a measurement of the differential pressure between the side port probing channel 20a and the static pressure probing channel 24, with increasing flow velocity. For the connection arrangement described with reference to FIG. 2B, Δp is large at high fluid velocities, and will thereby contribute to a large error at high fluid velocities.

Also the connection arrangement of FIG. 2C has limitations, however. For cone angles θ above a certain limit angle, the probing of the stagnation pressure $p_t$ in the stagnation pressure probing port will start to fail and introduce an additional, rapidly increasing error $\varepsilon_s$ with increasing cone angle θ.

FIG. 2D illustrates an exemplary detection of the pressure generated by the fluid flow in the first side port probing channel 20a by detecting the pressure difference between the first side port probing channel 20a and a known reference pressure 21, for example the ambient pressure outside the e.g. wind tunnel or turbo machinery, as the case may be. It will be appreciated that the other side port probing channels 20b-d may be differentially connected in the same manner. At high fluid speeds, the pressure difference Δp between the side port probing channel 20a and the reference pressure 21 will typically be large, and may generate a relative error $\varepsilon_a$ several orders of magnitude higher than that achievable when using the differential detection setup of FIG. 2C. However, with increasing cone angle θ, the contribution of the pressure difference Δp to the error $\varepsilon_a$ will rapidly become less significant than the contribution $\varepsilon_s$ of the failing due to the failing capture of the stagnation pressure at the stagnation pressure probing port. Hence, the differential detection of FIG. 2D may be beneficial at very large cone angles θ exceeding the limit angle.

FIG. 2E illustrates an exemplary detection of the stagnation pressure generated by the fluid flow by detecting the pressure difference between the stagnation pressure probing channel 18 and the reference pressure 21.

FIG. 2F illustrates an exemplary detection of the static pressure generated by the fluid flow by detecting the pressure difference between the static pressure probing channel 24 and the reference pressure 21.

Apparently, multiple or all of the exemplary connection arrangements of FIGS. 2A-2F may be operated in parallel, and the data sampled from the respective connection arrangements may be used, weighted, or discarded depending on the present flow characteristics. For example, for the determination of angles α, β, and/or θ, the differential detection of FIG. 2C may be used up to the limit angle when the stagnation pressure detection accuracy starts to fail. Above the limit angle, the angles α, β, and/or θ may be determined based on the detected pressures of all or a sub-set of the side ports as measured by the connection arrangement of FIG. 2D, i.e. detecting the differential pressures between the respective side port probing channels 20a-d and the external reference pressure 21. The reaching of the limit angle may be determined by monitoring the stagnation pressure using the connection arrangement of FIG. 2E, i.e. detecting the differential pressure between the stagnation pressure probing channel 18 and the external reference pressure 21.

The respective measurement ranges of the pressure meters 26 used for the respective differential measurements described hereinabove can be adapted for the respective expected pressure ranges.

FIGS. 3A-E and 4A-E illustrate a multi-hole pressure probe 110 according to a first embodiment. Even though the probe 110 illustrated in detail in FIGS. 3A-4E may visually differ somewhat from the schematically represented probe 10 of FIG. 1, it will be appreciated that the general teachings relating to the probe 10 of FIG. 1 are valid also for the probe 110 of FIGS. 3A-4E. Starting with the perspective view of FIG. 3A, the multi-hole pressure probe 110 comprises a probe tip 12 provided with a main channel inlet port 14 facing in an upstream direction along the longitudinal axis x. The probe 110 comprises a probe body 28 having a circular-cylindrical outer mantle face 30, and the probe tip 12 has a frustoconical outer probe tip surface 32 facing in the upstream direction U and tapering towards the main channel inlet port 14. The probe body 28 extends along the longitudinal axis x, and is at its downstream end carried by a probe suspension arm 34 extending from the probe body 28 in a direction perpendicular to the longitudinal axis x. The probe suspension arm 34 enables suspending the probe body 28 in a fluid flow via any lateral boundary surfaces constraining the fluid flow.

FIG. 3B illustrates the multi-hole pressure probe 110 as seen from the side, FIG. 3C illustrates the probe body 28 and a portion of the probe suspension arm 34 of the multi-hole pressure probe 110 as seen from the front, looking in the downstream direction opposite to the upstream direction U (FIG. 3A), FIG. 3D illustrates the probe body 28 and a portion of the probe suspension arm 34 in perspective as seen obliquely from the rear, and FIG. 3E illustrates a section through the probe body indicated by the line E-E in FIG. 3B.

Now referring to FIG. 3C, the tapering probe tip surface 32 comprises a first side port arrangement 15*a*, a second side port arrangement 15*b*, a third side port arrangement 15*c*, and a fourth side port arrangement 15*d*, each side port arrangement 15*a-d* comprising a single respective aperture, i.e. a single respective side port 16*a-d*. Each side port arrangement 15*a-d* is connected to a respective side port probing channel (not illustrated in the view of FIG. 3C). Even though each side port arrangement 15*a-d* comprises only one single side port 16*a-d*, it will be appreciated that a side port arrangement may also comprise several apertures or side ports which connect to the same side port probing channel.

The section of FIG. 3E illustrates the third and fourth side ports 16*c*, 16*d*, along with the first, third and fourth side port probing channels 20*a*, 20*c*, 20*d*. The probe tip surface 32 adjacent to the side ports 16*c*, 16*d* forms an angle of about 45 degrees with the longitudinal axis. As is apparent from FIG. 3E, the main channel inlet port 14 is connected to a main channel 36, which extends from the main channel inlet port 14 in a downstream direction D, opposite to the upstream direction U, to a main channel outlet arrangement 40 at the downstream end face of the probe body 28. The main channel 36 is defined by a main channel inner wall 38. The main channel 36 splits into two parallel sub-channels 36*a*, 36*b*, each of which ends in a respective main channel outlet 40*a*, 40*b* of the main channel outlet arrangement 40.

A stagnation pressure probing port 42 is arranged centrally, as seen in a cross-section perpendicular to the longitudinal axis, within the main channel 36, downstream of the main channel inlet port 14. The stagnation pressure probing port 42 faces in the upstream direction U towards the main channel inlet port 14, and is connected to the stagnation pressure probing channel 18 enabling the stagnation pressure $p_t$, and thereby the speed of the fluid flow entering the main channel 36, to be detected in e.g. the manner illustrated in FIG. 2B. The first, i.e. upstream-most, portion of the stagnation pressure probing channel 18 is circular-cylindrical.

The main channel inner wall 38 has a convergent section 44 extending in the downstream direction from the main channel inlet port 14. In the convergent section 44, the cross-sectional area, perpendicular to the longitudinal direction x (FIG. 3A), of the main channel 36 is gradually reduced in the downstream direction D. Thereby, any fluid flow entering the main channel inlet port 14 at a large angle θ will be at least partly aligned with the longitudinal axis x (FIG. 3A) before reaching the stagnation pressure probing port 42. Thereby, a more accurate measurement of stagnation pressure and the speed of the fluid flow in relation to the probe 110 may be obtained. As can be seen in the view of FIG. 3E, the convergent section 44 flares in the upstream direction U following a gradually increasing cone angle, such that the main channel inner wall 38 at the convergent section 44 has the general shape of a trumpet bell.

Downstream of the convergent section 44 and the stagnation pressure probing port 42, the main channel inner wall 38 has a divergent section 46, i.e. a section defining a portion of the main channel 36 having a cross-sectional area, perpendicular to the longitudinal direction x (FIG. 3A), which expands in the downstream direction D. The divergent section 46 expands the fluid flow downstream of the convergent section 44 and the stagnation pressure probing port 42, which even further improves alignment of the fluid flow with the longitudinal axis x at the longitudinal position of the stagnation pressure probing port 42. Between the convergent and divergent sections 44, 46, the main channel inner wall has a parallel section 45, within which the stagnation pressure probing port 42 is arranged.

At the longitudinal position of the stagnation pressure probing port 42, the main channel inner wall 38 is circular-cylindrical, even though clearly, it can also have other shapes.

The stagnation pressure probing port 42 has a stagnation pressure probing port width W1 perpendicular to the longitudinal axis x (FIG. 3A), and is positioned at a longitudinal distance D1 from the main channel inlet port 14. The main channel inlet port 14 has a main channel inlet port width W2 perpendicular to the longitudinal axis x. In the illustrated embodiment, the longitudinal distance D1 is about 2% times the stagnation pressure probing port width W1. Moreover, the main channel inlet port width W2 is about 5 times the stagnation pressure probing port width W1. The width W2 of the main channel inlet port 14 is about 45% wider than the width W3, perpendicular to the longitudinal axis x, of the main channel 36 at the position of the stagnation pressure probing port 42, which corresponds to the main channel inlet port 14 having a cross-sectional area, perpendicular to the longitudinal axis x (FIG. 3A), which is more than twice the cross-sectional area of the main channel 36 at the at the longitudinal position of the stagnation pressure probing port 42. The circular-cylindrical outer mantle face 30 of the probe body 28 has an outer width W4, perpendicular to the longitudinal axis x, of about 3 mm.

FIG. 3E further illustrates a pair of static pressure probing ports 22*a*, 22*b*, arranged in the divergent section 46. The rims of the port openings of the static pressure probing ports 22*a*, 22*b* extend parallel to the flow in the divergent section 46 in order to isolate the static pressure from any dynamic components due to the flow speed. By probing the static pressure inside the main channel 36 downstream of the convergent section 44, the fluid flow will have been aligned once reaching the static pressure probing ports 22*a*, 22*b*, thereby minimizing the impact of the flow direction F1 (FIG. 1) on the static pressure readings. Even though the probe 110 of FIG. 3E is provided with two static pressure probing ports 22*a*, 22*b*, the respective static pressure probing channels 24*a*, 24*b* (FIG. 4A) may converge to one single static pressure probing channel 24 (FIG. 1). The static pressure probing ports 22*a*, 22*b* are also clearly illustrated in the view of FIG. 3D.

Figure 4A:
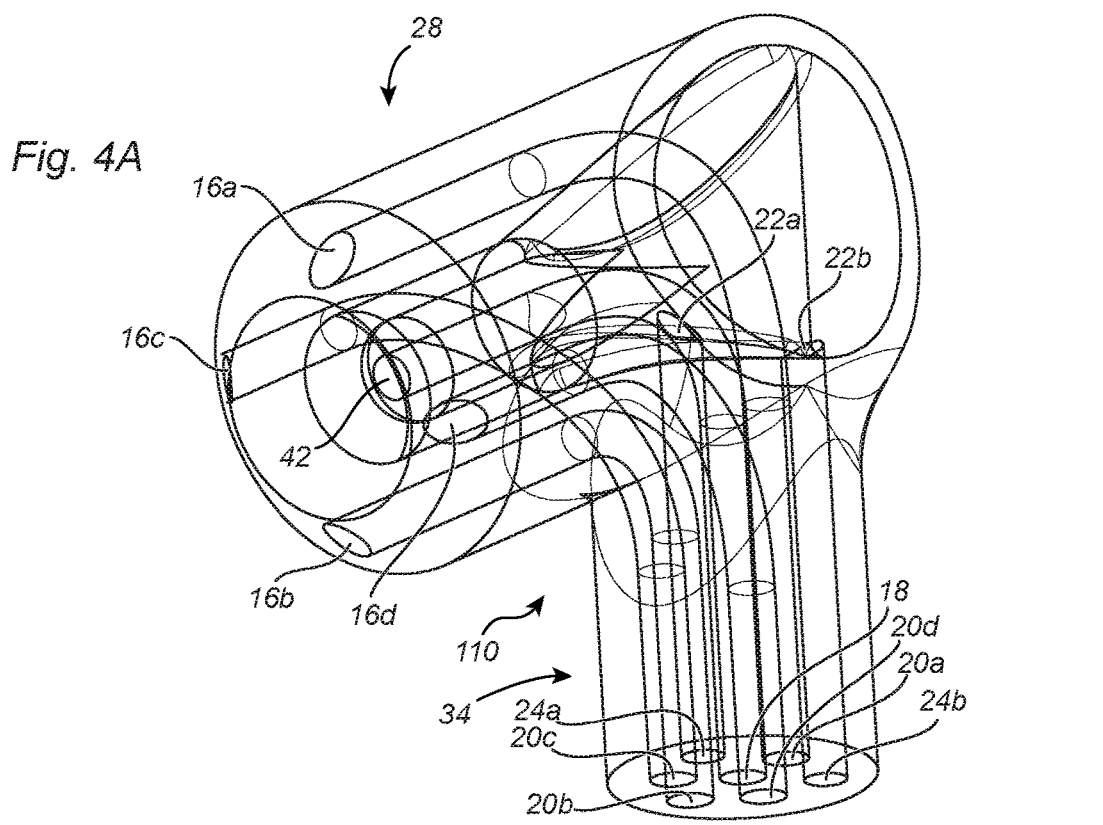
FIG. 4A is a transparent view in perspective of the top portion of the probe of FIGS. 3C and 3D, the perspective corresponding to that of FIG. 3A.
Figure 4B:
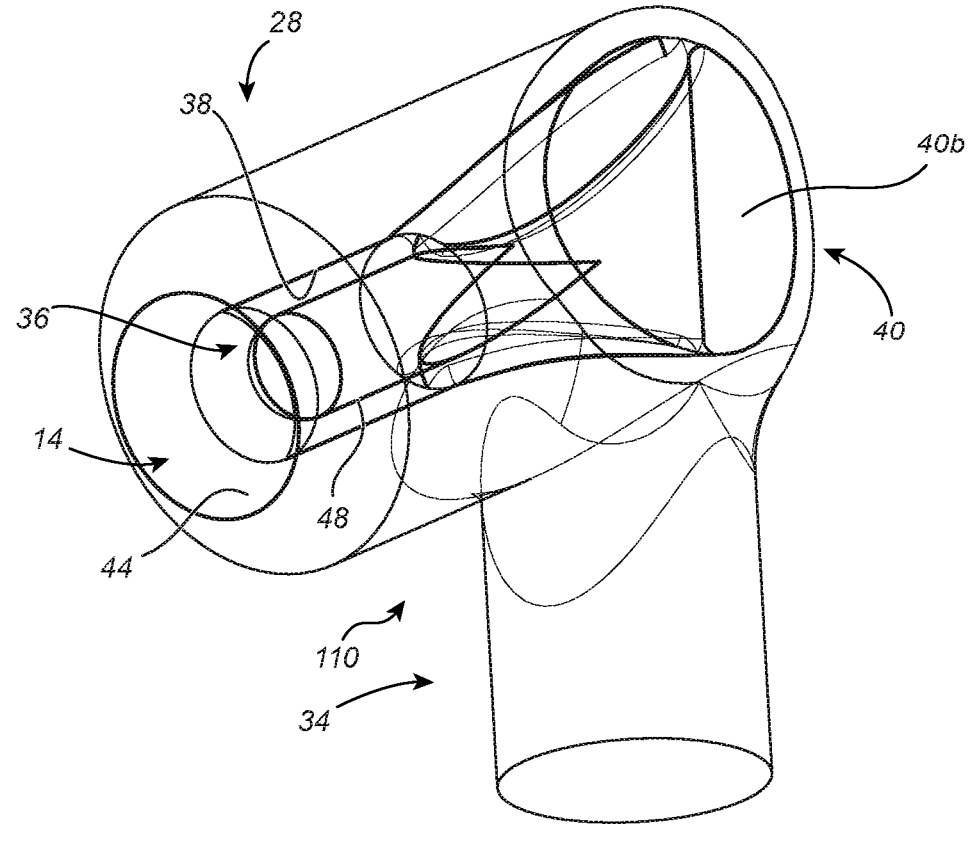
FIG. 4B is a transparent view in perspective of the top portion of the probe of FIG. 4A, illustrating a main channel through the probe.
Figure 4C:
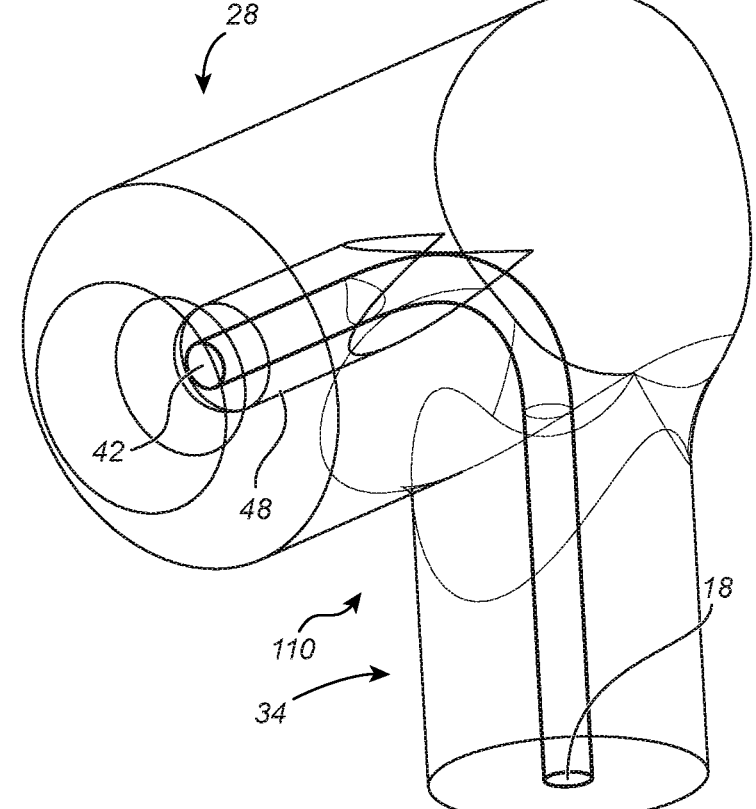
FIG. 4C is a transparent view in perspective of the top portion of the probe of FIG. 4A, illustrating a stagnation pressure probing port and a stagnation pressure probing channel in the probe.
Figure 4D:
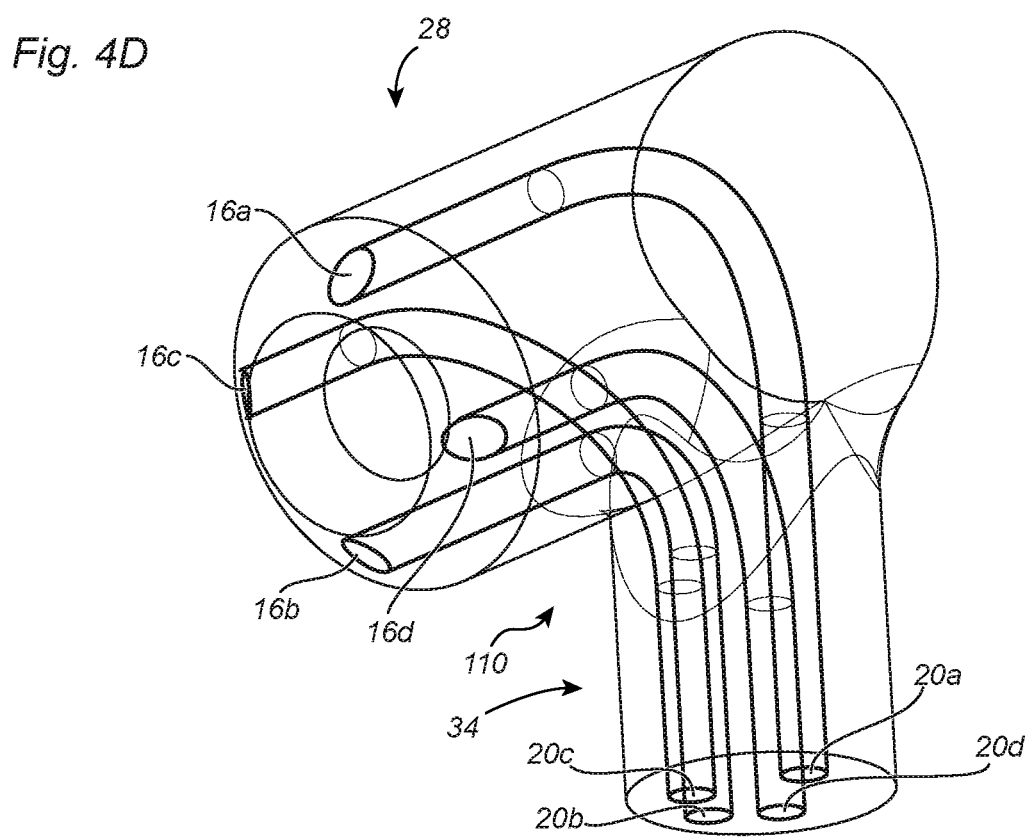
FIG. 4D is a transparent view in perspective of the top portion of the probe of FIG. 4A, illustrating a set of side ports and side port probing channels in the probe.
Figure 4E:
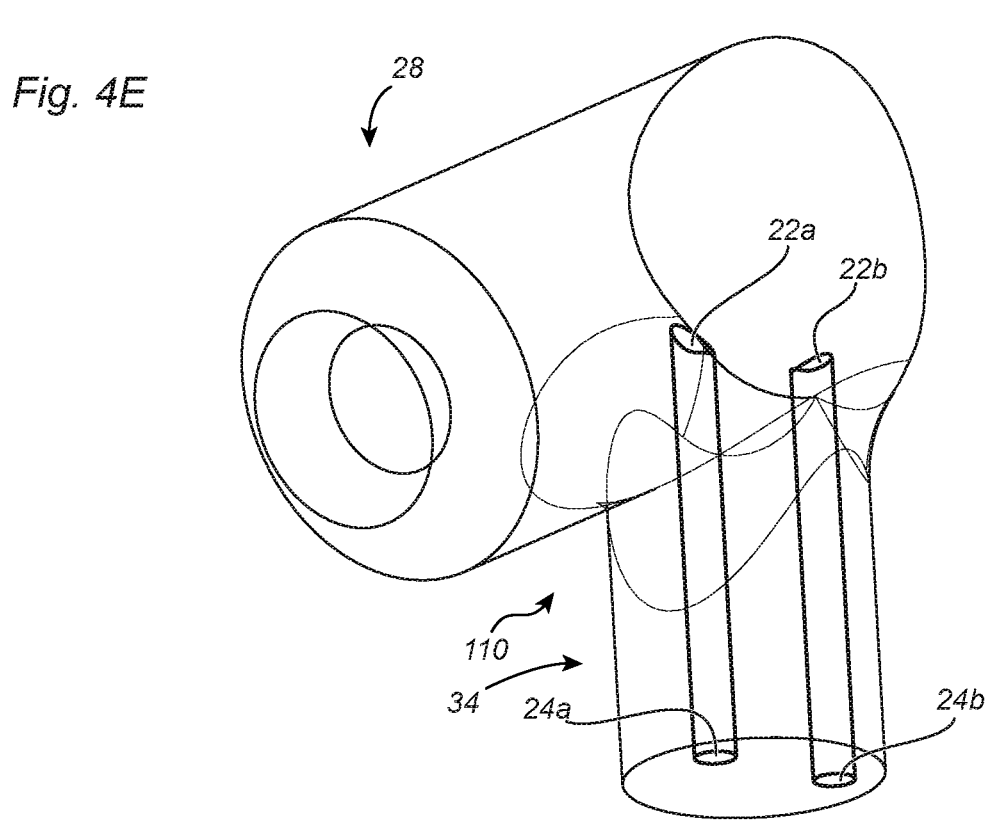
FIG. 4E is a transparent view in perspective of the top portion of the probe of FIG. 4A, illustrating a set of static pressure probing ports and static pressure probing channels in the probe.

FIG. 4A is a magnified view of a top portion IV (FIG. 3A) of the probe 110 in transparent mode, showing the respective shapes of all its internal ports and channels. In the view of FIG. 4A, each of the stagnation, side, and static pressure probing ports 42, 16*a-d*, 22*a-b* and stagnation, side, and static pressure probing channels 18, 20*a-d*, 24*a-b* are visible. In order to clarify the complex geometry presented in FIG. 4A, each of FIGS. 4B, 4C, 4D and 4E illustrates a subset of the ports and channels of FIG. 4A. More specifically, FIG. 4B illustrates the main channel, FIG. 4C illustrates the stagnation pressure probing port and channel 42, 18, FIG. 4D illustrates the side ports 16*a-d* and corresponding probing channels 20*a-d*, and FIG. 4E illustrates the static pressure probing ports 22*a*, 22*b* and corresponding probing channels 24*a*, 24*b*. It will be appreciated that the illustrations of FIGS. 4B-4E do not represent separate probes, but merely illustrate different features of the probe 110 of FIG. 4A. As is apparent in FIGS. 4A-E, the probing channels 18, 20*a-d*, 24*a-b* are arranged within the probe suspension arm 34. Beneficially, the probe 110 is integrally formed as a single piece of metal by means of additive manufacturing.

As may be best seen in FIG. 4C, the stagnation pressure probing port 42 is arranged in the upstream end of a circular-cylindrical stagnation pressure probing channel pipe 48, which extends longitudinally from a support post 50 (FIGS. 3C-3E) dividing the main channel 36 (FIG. 3E) into the two sub-channels 36a, 36b (FIG. 3E). As is apparent from FIGS. 4C and 4D in combination with FIG. 3E, the stagnation pressure probing channel 18 and the first side port probing channel 20a are formed within, and reach the probe suspension arm 34 via, the support post 50.

FIG. 5A to FIG. 8 illustrate a multi-hole pressure probe 210 according to a second embodiment. Again, even though the probe 210 illustrated in detail in FIGS. 5A-8 may visually differ somewhat from the schematically represented probe 10 of FIG. 1, it will be appreciated that the general teachings relating to the probe 10 of FIG. 1 are valid also for the probe 210 of FIGS. 5A-8. It will also be appreciated that, unless stated or illustrated otherwise, the probe 210 of FIGS. 5A-8 is functionally and structurally similar to the probe 110 described in detail with reference to FIGS. 3A-4E.

Figures 5A, 5B, 5C:
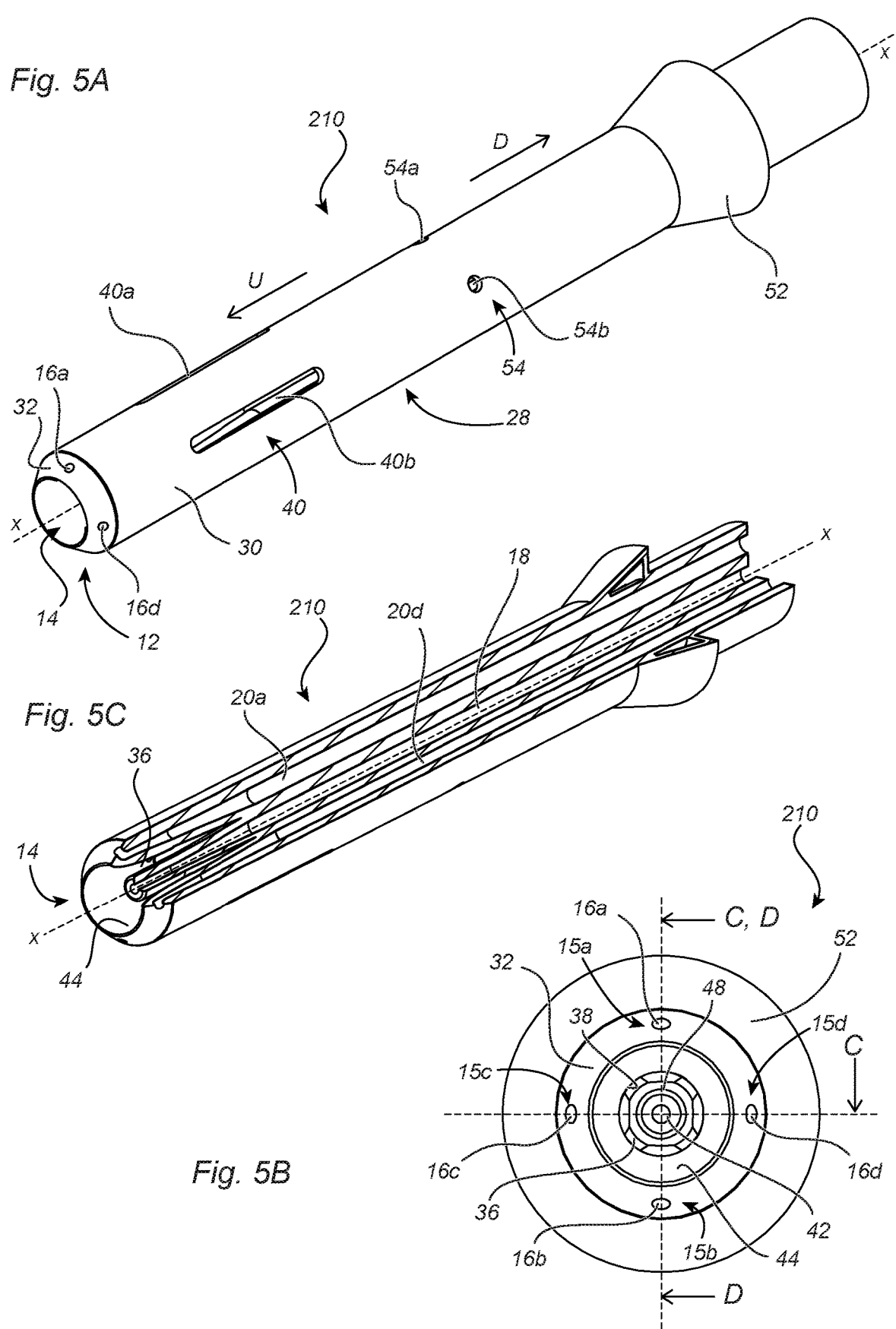
FIG. 5A is a perspective view of the schematic multi-hole probe of FIG. 1 according to a second embodiment.
FIG. 5B is a front view of the multi-hole probe of FIG. 5A.
FIG. 5C is a perspective view of the probe of FIG. 5A in section, the section taken along the lines C-C of FIG. 5B.

Starting with the perspective view of FIG. 5A, the multi-hole pressure probe 210 has an upstream end comprising a probe tip 12 provided with a main channel inlet port 14 facing in an upstream direction U along the longitudinal axis x. The probe 210 comprises an elongate probe body 28 having a circular-cylindrical outer mantle face 30, and the probe tip 12 has a frustoconical outer probe tip surface 32 facing in the upstream direction U and tapering towards the main channel inlet port 14. The probe body 28 extends along the longitudinal axis x, and is suspended at its downstream end in a non-illustrated manner. The downstream end is provided with a circumferential collar 52 extending radially, with respect to the longitudinal axis x, from the probe body 28. The radial collar 52 serves for deflecting the fluid flow from any piping or connector arrangements connected to respective probing channels at the downstream end of the probe 210. Similar to the probe 110 of FIGS. 3A-4E, the probe 210 is provided with a set of main channel outlet ports 40a, 40b. The probe 210 of FIG. 5A however differs from the probe 110 of FIGS. 3A-4E in that the main channel outlet ports 40a-40b are circumferentially distributed about the cylindrical mantle face 30 of the probe body 28, and face in the radial direction. In the illustrated embodiment, the probe 210 has a main channel outlet arrangement 40 comprising four main channel outlet ports distributed circumferentially at the same longitudinal position, two of which, 40a, 40b, are visible in the view of FIG. 5A. The main channel outlet ports 40a, 40b of the main channel outlet arrangement 40 are elongate, the direction of elongation extending along the longitudinal axis x. The probe 210 is also provided with a set of external static pressure probing ports 54 comprising four external static pressure probing ports, two of which, 54a, 54b, are visible in the view of FIG. 5A. The external static pressure probing ports 54 were made to enable comparative measurements for experimental verification of the operation of the internal static pressure probing ports (not visible in FIG. 5A) inside the main channel, and will not be discussed further herein.

FIG. 5B illustrates the probe 210 as seen from the front, looking in the downstream direction D (FIG. 5A). The tapering probe tip surface 32 comprises a first side port arrangement 15a, a second side port arrangement 15b, a third side port arrangement 15c, and a fourth side port arrangement 15d, each side port arrangement 15a-d again comprising a single respective side port 16a-d. The probe 210 further comprises a stagnation pressure probing port 42 in the upstream end of a stagnation pressure probing channel pipe 48. A main channel 36, defined by a main channel inner wall 38, extends in the downstream direction D (FIG. 5A)

from the main channel inlet port 14 (FIG. 5A). An upstream end of the main channel 36 flares, i.e. the main channel inner wall 38 has a convergent section 44 which converges in the downstream direction D.

FIG. 5C illustrates the section indicated by C-C in FIG. 5B. Each side port arrangement 16a-d (FIG. 3B) is connected to a respective side port probing channel, wherein the first and fourth side port probing channels 20a, 20d are visible in the view of FIG. 5C. Each of the side port probing channels has a cross-section which increases in the downstream direction. Likewise, the stagnation pressure probing port 42 is connected to a stagnation pressure probing channel 18, the cross-section of which increases in the downstream direction.

Figure 5D:
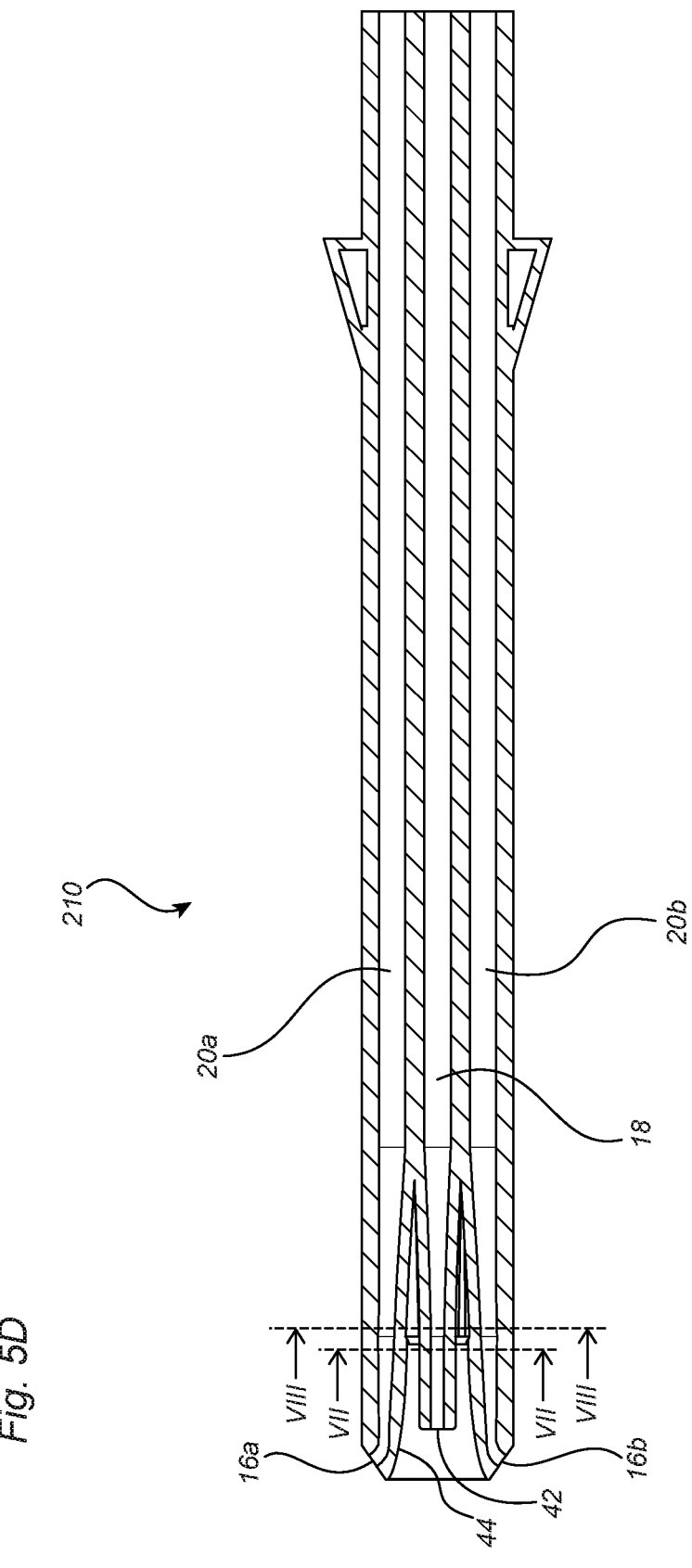
FIG. 5D is a section of the probe of FIGS. 5A-C, the section taken along the line D-D of FIG. 5B.

FIG. 5D is a view of the section indicated by D-D in FIG. 5B, and illustrates the profile of the convergent section 44 in greater detail. As may be apparent from the view of FIG. 5D, the stagnation pressure probing port 42 is arranged within the convergent section 44.

Figure 5E:
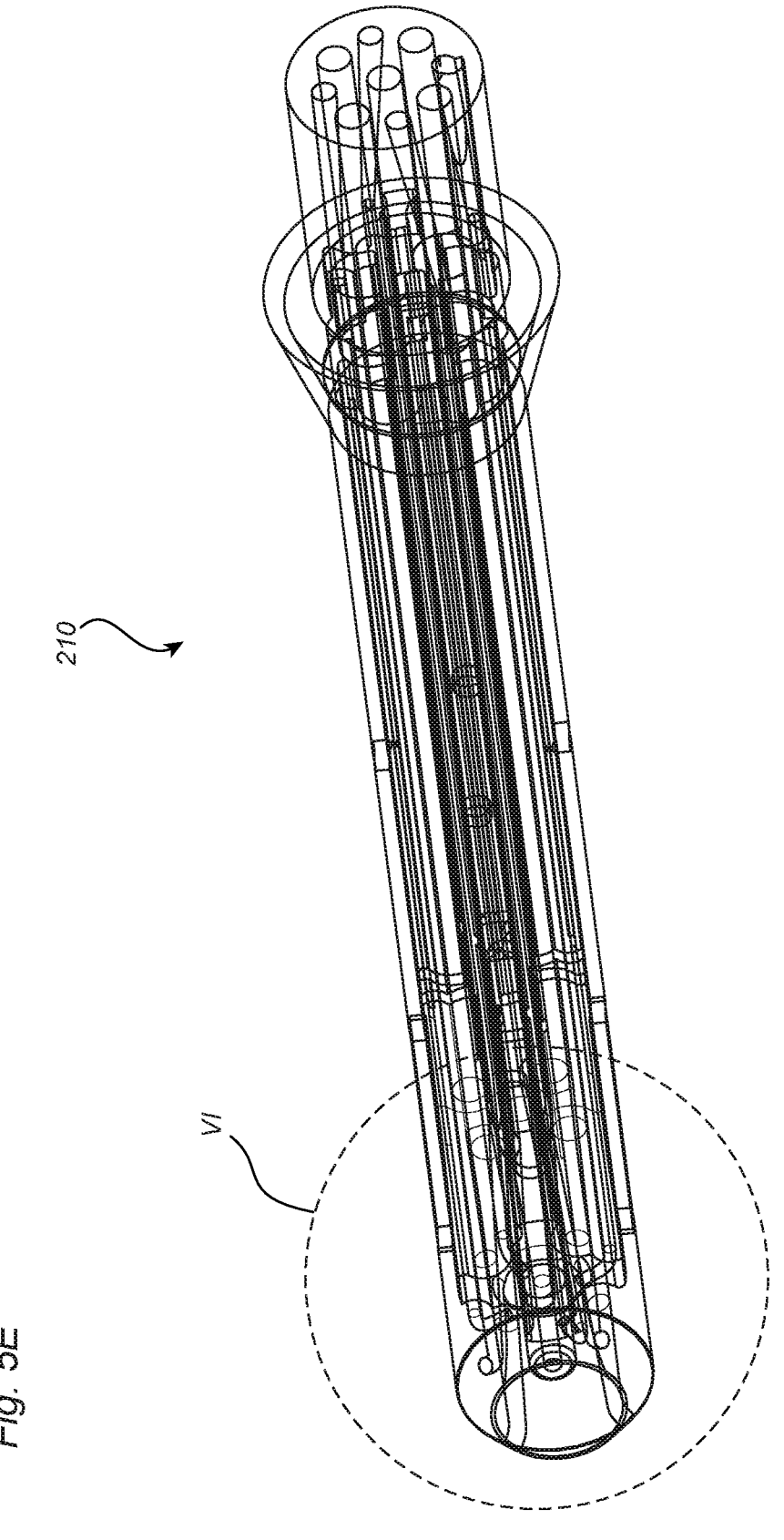
FIG. 5E is a transparent view in perspective of the probe of FIGS. 5A-D, the perspective corresponding to that of FIG. 5A.
Figure 6A:
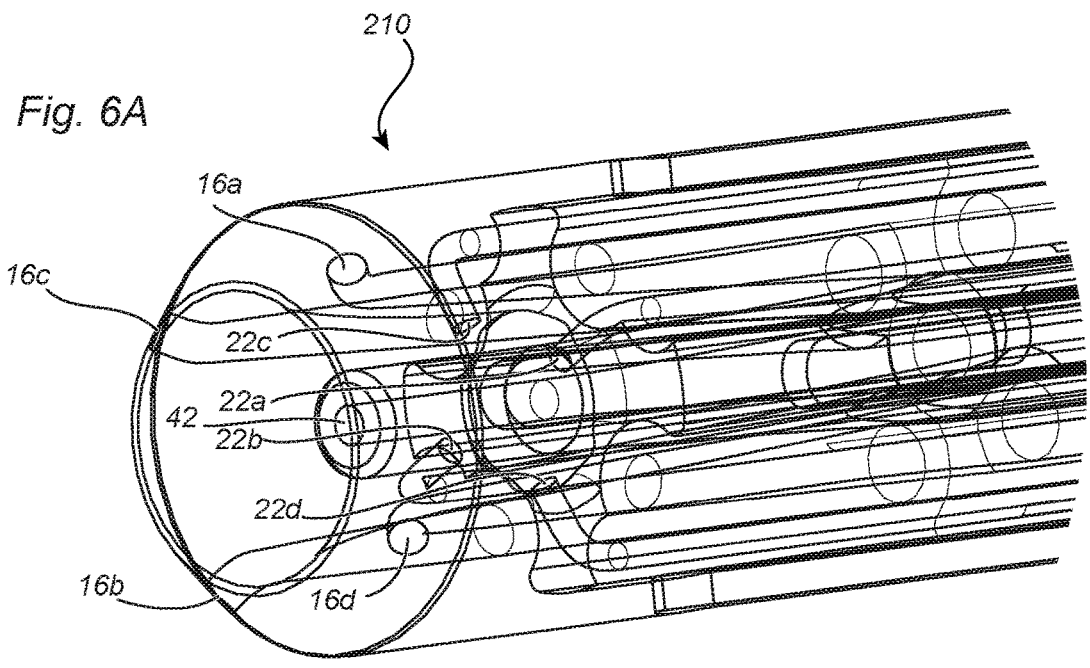
FIG. 6A is a magnified view of a portion of FIG. 5E, illustrating an upstream end portion of the probe of FIGS. 5A-E.
Figure 6B:
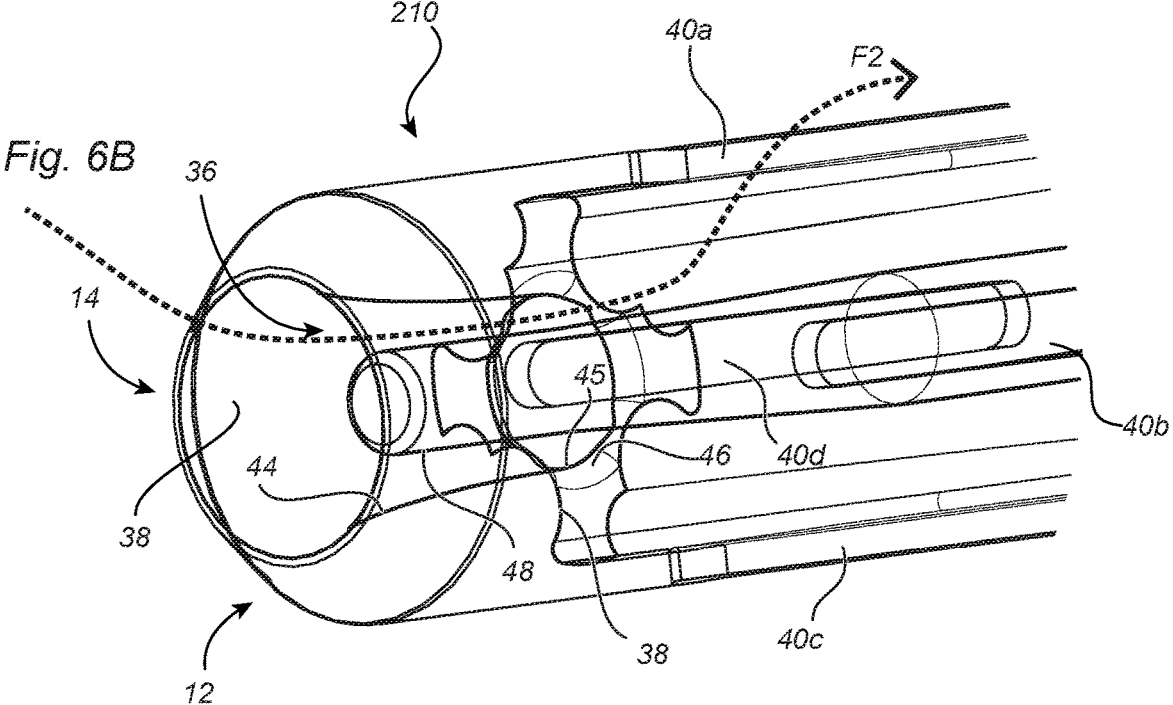
FIG. 6B is a transparent view in perspective of the upstream end portion of the probe of FIGS. 5A-5E, illustrating a main channel through the probe.
Figure 6C:
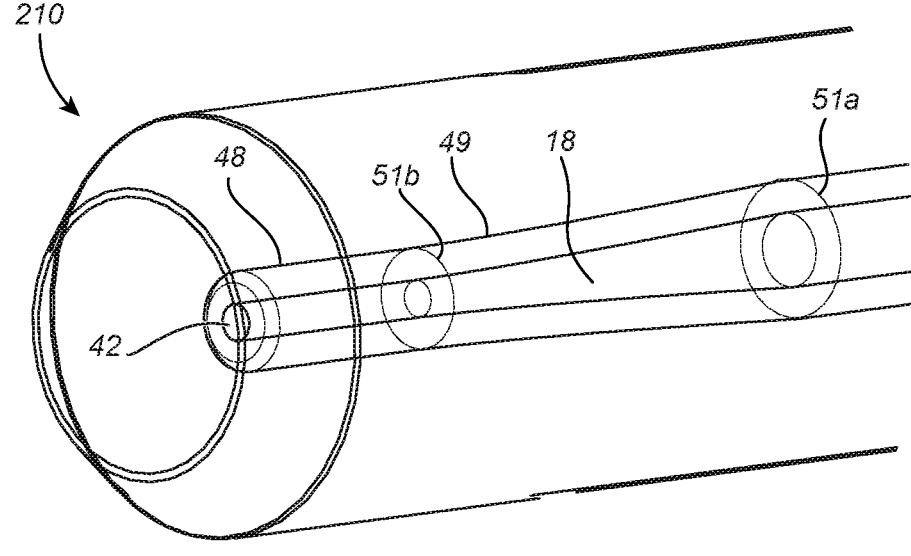
FIG. 6C is a transparent view in perspective of the upstream end portion of the probe of FIGS. 5A-5E, illustrating a stagnation pressure probing port and a stagnation pressure probing channel in the probe.
Figure 6D:
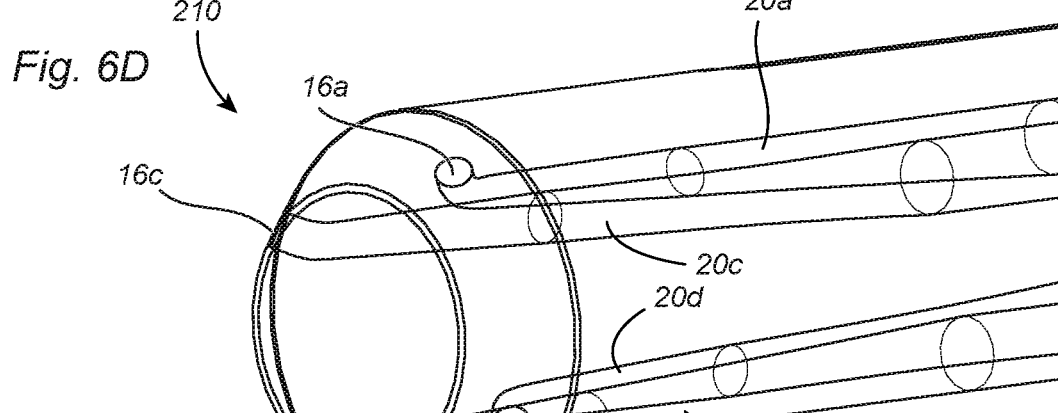
FIG. 6D is a transparent view in perspective of the upstream end portion of the probe of FIGS. 5A-5E, illustrating a set of side ports and side port probing channels in the probe.
Figure 6E:
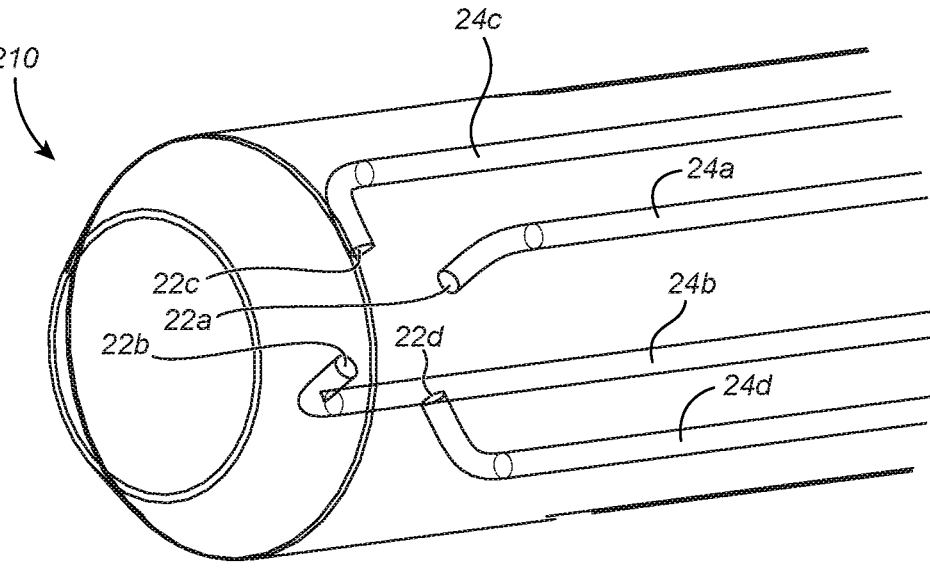
FIG. 6E is a transparent view in perspective of the upstream end portion of the probe of FIGS. 5A-5E, illustrating a set of static pressure probing ports and static pressure probing channels in the probe.

FIG. 5E is a view of the probe 210 in transparent mode, showing the respective shapes of all its internal ports and channels. In order to clarify the complex geometry presented in FIG. 5E, FIG. 6A is a magnified view of the upstream end of the probe 210 as illustrated in FIG. 5E, the area of magnification indicated by VI-VI in FIG. 5E. In order to further clarify the geometry of the probe 210, each of FIGS. 6B, 6C, 6D and 6E illustrates only a subset of the ports and channels of FIG. 6A. More specifically, FIG. 6B illustrates the main channel 36, FIG. 6C illustrates the stagnation pressure probing port and channel 42, 18, FIG. 6D illustrates the side ports 16a-d and corresponding probing channels 20a-d, and FIG. 6E illustrates a set of internal static pressure probing ports 22a, 22b, 22c, 22d and corresponding probing channels 24a, 24b, 24c, 24d. It will be appreciated that the illustrations of FIGS. 6B-6E do not represent separate probes, but merely illustrate different features of the probe 210 of FIG. 6A.

Starting with the view of FIG. 6A, the probe 210 comprises, similar to the probe 110 of FIGS. 3A-4E, a set of internal static pressure probing ports—in the present case, four internal static pressure probing ports 22a, 22b, 22c, 22d. Each of the internal static pressure probing ports 22a-d, as well as the stagnation pressure probing port 42, opens into and probes a respective pressure in the main channel 36.

FIG. 6B illustrates the main channel 36 in greater detail. The upstream end of the main channel inner wall 38 gradually converges, in a convergent section 44, in the downstream direction D (FIG. 5A). The stagnation pressure probing channel pipe 48 extends upstream well into the convergent section 44, freely suspending the stagnation pressure probing port 42 (FIG. 6A) in the main channel 36 at a longitudinal position within the convergent section 44, downstream of the main channel inlet port 14. Downstream of the convergent section 44, the main channel 36 abruptly expands in a divergent section 46 into a substantially larger, cross-shaped cross-section. Between the convergent and divergent sections 44, 46, there is a very short parallel section 45 of the main channel 36, as defined by the main channel inner wall 38.

FIG. 6B also illustrates an exemplary fluid flow F2 impinging on the probe tip 12 at a large cone angle θ (FIG. 1). The fluid flow F2 is aligned in the convergent section 44 prior to passing the stagnation pressure probing port 42 (FIG. 6A), and thereafter exits the probe 210 via the divergent section 46 and the first main channel outlet 40a.

FIG. 6C more clearly illustrates the shape of the stagnation pressure probing channel pipe 48, and the stagnation pressure probing port and channel 42, 18. The outer mantle face 49 of the stagnation pressure probing channel pipe 48 tapers in the upstream direction. In the illustrated embodiment, a cross-sectional area of a first, downstream section 51a of the outer mantle face 49 of the stagnation pressure probing channel pipe 48 is more than twice as large as a cross-sectional area of a second section 51b of the outer mantle face 49 of the stagnation pressure probing channel pipe 48 upstream of said first, downstream section 51a. An upstream end portion of the stagnation pressure probing channel 18 has a constant cross-section, whereas it has a gradually expanding cross-section further downstream.

FIG. 6D illustrates the shapes of the side ports 16a-d and side port probing channels 20a-d. Adjacent to the side ports 16a-d, the side port probing channels extend perpendicular to the tapering outer probe tip surface 32, to thereafter curve, expand, and assume a direction parallel to the longitudinal axis x (FIG. 5A).

FIG. 6E illustrates the internal static pressure probing ports 22a-d and static pressure probing channels 24a-d in greater detail. The internal static pressure probing ports 22a-d face radially towards each other. Adjacent to the static pressure probing ports 22a-d, the static pressure probing channels 24a-d extend radially away from each other, perpendicular to the longitudinal axis x (FIG. 5A) of the probe 210, to thereafter curve and continue in the downstream direction D (FIG. 5A) parallel to the longitudinal axis x.

Figure 7:
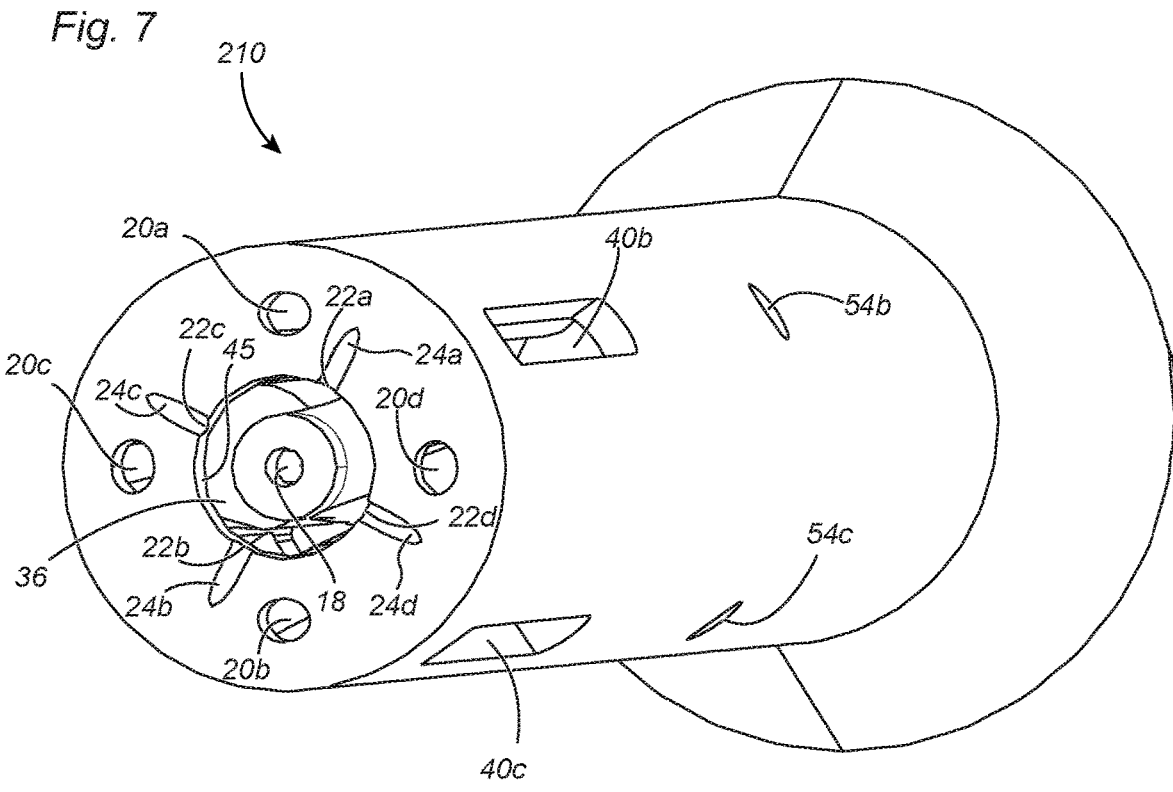
FIG. 7 is a perspective view of a section of the probe of FIGS. 5A-6E, the section taken along the line VII-VII of FIG. 5D.
Figure 8:
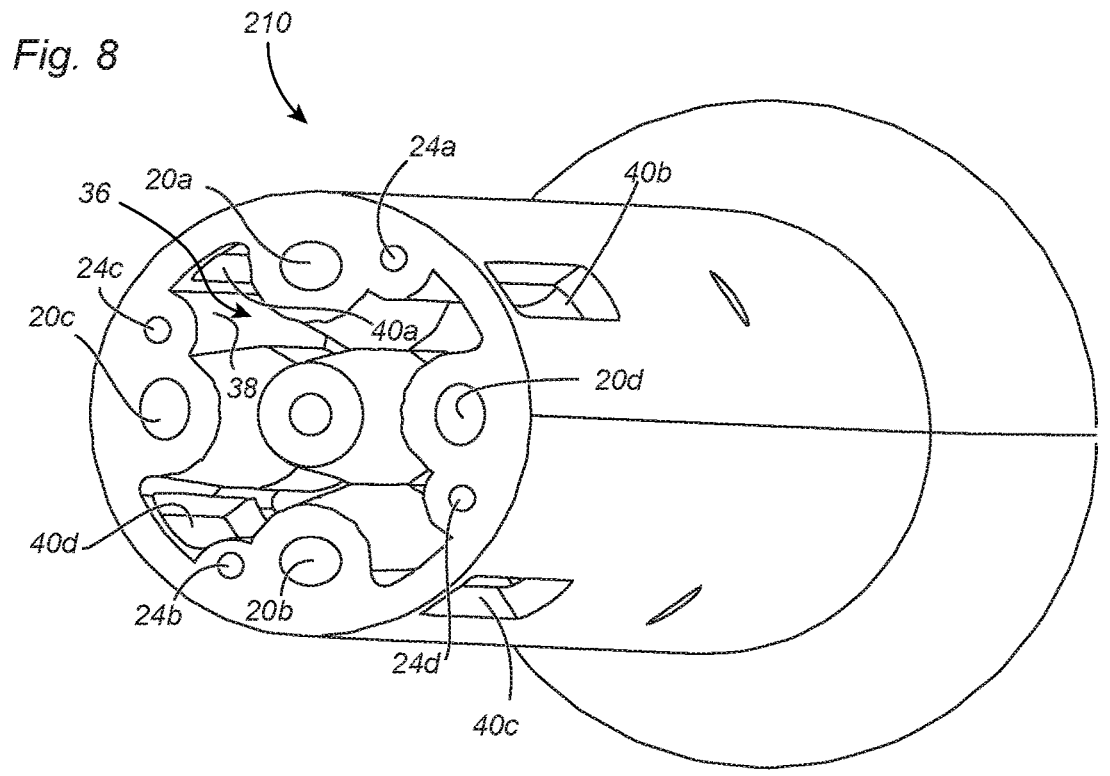
FIG. 8 is a perspective view of a section of the probe of FIGS. 5A-6E, the section taken along the line VIII-VIII of FIG. 5D.

FIG. 7 illustrates the probe 210 in a section taken along the line VII-VII indicated in FIG. 5D, at the longitudinal position of the parallel section 45 (FIG. 6B), and FIG. 8 illustrates the probe 210 in a section taken along the line VIII-VIII indicated in FIG. 5D, immediately downstream of the divergent section 46 (FIG. 6B). As is apparent from FIG. 7, the internal static pressure probing ports 22a-d are arranged at the parallel section 45 (FIG. 6B) of the main channel 36.

FIG. 8 more clearly illustrates the cross- or star-shaped main channel 36 downstream of the divergent section 46, wherein each arm of the cross/star communicates with the surroundings via a respective main channel outlet 40a-d.

Figure 9:
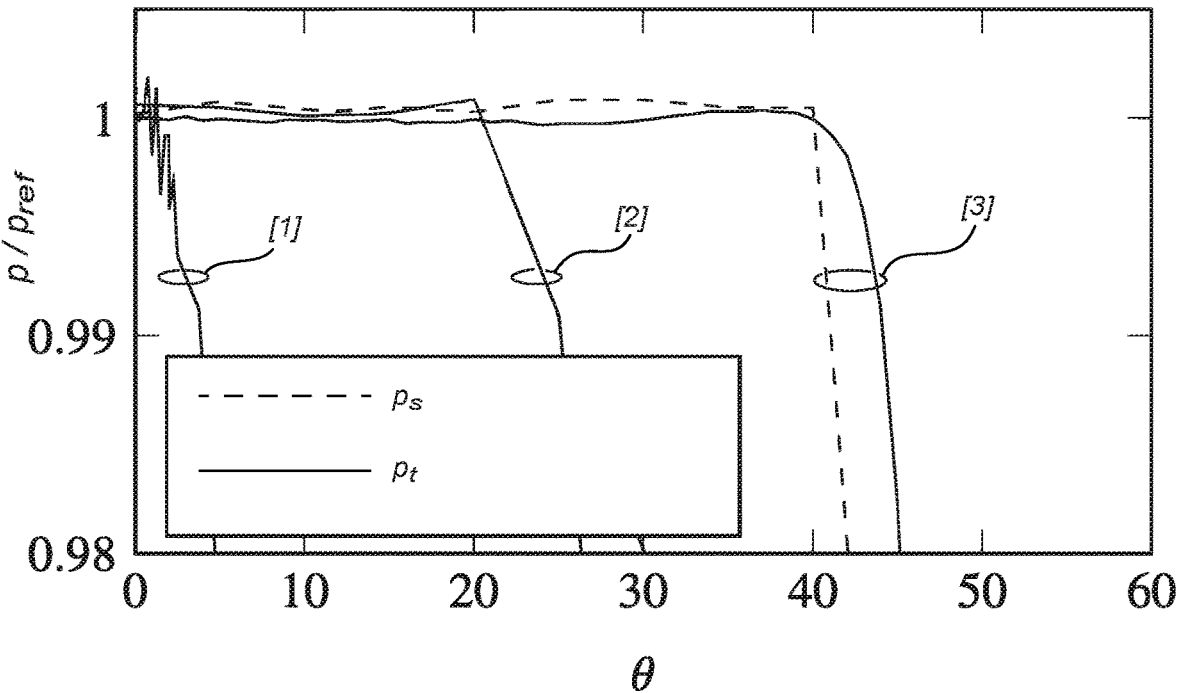
FIG. 9 is a diagram illustrating a cone angle dependency of the probe of FIGS. 5A-8 in comparison with two reference probes.

Now with reference to FIG. 9, three different probes, all having a circular-cylindrical probe body of the same outer diameter of 5 mm, were experimentally evaluated in a probe calibrator. The probe calibrator turned the respective probes in a known air flow, moving at a flow speed of 60 m/s, by varying the roll angle φ and cone angle θ in a strictly controlled manner. The three different probes are

[1] a standard five-hole probe having a frustoconical probe tip, with a 450 cone angle, and a circular-cylindrical stagnation pressure probing port formed directly in the outer probe tip surface,

[2] a truncated pyramid probe with a cylindrical stagnation pressure probing port, manufactured based on the drawings of U.S. Pat. No. 7,480,548 B2, and

[3] the probe 210 according to the second embodiment of FIGS. 5A-8, wherein the measurement results associated with the respective probes are indicated with [1]-[3] in FIG. 9. All probes had their respective stagnation pressure probing channels differentially connected to the stagnation pressure probing channel of a separate Pitot probe used as reference, and their respective static pressure probing channels were differentially connected to the static pressure probing channel of the Pitot probe. The reference Pitot probe was fixedly attached with its port facing directly in the upstream direction of the fluid flow, to provide a pressure reference $p_{ref}$.

From the results of FIG. 9, it can be concluded that the standard probe fails to accurately capture the flow properties using the stagnation pressure probing port at few degrees' cone angle θ. The truncated pyramid probe fails to accurately capture the stagnation pressure ($p_t$) at a cone angle θ of about 20°. The external static pressure probing ports of the truncated pyramid probe as well as the standard probe fail to accurately capture the static pressure at a few degrees' cone angle θ. The probe 210 of FIGS. 5A-8, on the other hand, remains accurate up to a cone angle θ of about 44° for stagnation pressure $p_t$ and about 40° for static pressure $p_s$.

As is apparent from the measurement results, the probe 210 according to the second embodiment of FIGS. 5A-8 enables staying within the differential detection regime of FIG. 2C up to a much larger cone angle θ than the other probes in the comparison. This enables a side port pressure detection accuracy and a cone angle determination accuracy associated therewith which, at angles exceeding about 20°, may be orders of magnitude better than that of the other probes.

Figure 10:
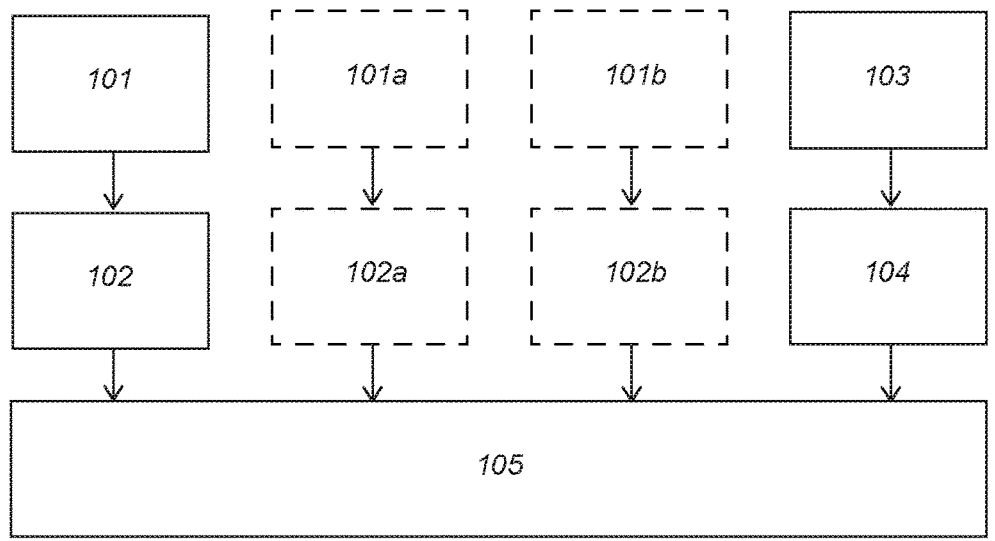
FIG. 10 is a flow chart illustrating methods of probing a fluid flow.

FIG. 10 illustrates an exemplary method of probing an unknown fluid flow using any of the probes 10, 110, 210 disclosed hereinabove.

In step 101, a set of differential pressures $\Delta p_a \ldots p_d = ((p_a, \ldots p_d) - p_t)$ between the stagnation pressure probing channel 18 and respective side port probing channels 20a-d are measured using the connection arrangement of FIG. 2C.

In step 102, angles α, β, and/or θ are obtained based on the differential pressures $\Delta p_a \ldots \Delta p_d$ via a calibration function obtained via previous calibration in a known flow.

In step 103, a dynamic pressure q is obtained, e.g. based on the differential pressure between the stagnation pressure probing channel 18 and the static pressure probing channel 24 using the connection arrangement of FIG. 2B, i.e.

$$q = p_t - p_s.$$

In step 104, the fluid speed v is calculated based on the dynamic pressure q.

In step 105, the three-dimensional velocity components $v_x$, $v_y$, $v_z$ are calculated based on the angles α, β and the speed v.

Compared to the methods described in U.S. Pat. No. 7,480,548 B2, the angles α, β are determined via differential pressure measurements between the side ports and an upstream-facing reference port (the stagnation pressure probing port 42 or another side port 16a-d) of the probe 10, 110, 210 itself. Thereby, the respective errors $$\varepsilon_a \ldots \varepsilon_d = c \ (\Delta p_a \ldots \Delta p_d)$$

are reduced as described with reference to FIGS. 2C and 2D above, due to the relatively moderate detection ranges required for the differential pressure measurements. Moreover, in step 104, the fluid speed v is determined independently of the fluid pressures in the side ports 16a-d. Thereby, the angle sensitivity of the fluid speed determination is reduced.

Steps 101-102 may be replaced by steps 101a-b and 102a-b as follows:

In step 101*a*, a first differential pressure $\Delta p_{ab} = (p_a - p_b)$ between the first and second side port probing channels 20*a*, 20*b* are measured.

In step 102*a*, angle β is obtained based on the differential pressures $\Delta p_{ab}$ via a first respective calibration function obtained via previous calibration in a known flow.

In step 101*b*, a second differential pressure $\Delta p_{cd} = (p_c - p_d)$ between the third and fourth side port probing channels 20*a*, 20*b* are measured.

In step 102*b*, angle α is obtained based on the differential pressures $\Delta p_{cd}$ via a second respective calibration function obtained via previous calibration in a known flow.

The use of different respective calibration functions for the respective pairs of side ports 16*a*, 16*b* and 16*c*, 16*d* may be particularly useful e.g. if the respective pairs of side ports 16*a*, 16*b* and 16*c*, 16*d* geometrically differ from each other, or if the operational ranges of the two angles α, β are different.

The multi-hole pressure probes 10, 110, 210 described in detail hereinabove may be used for determining the flow direction, flow speed, and/or pressures, such as static pressure of a fluid in turbomachinery. They may also be used for determining the flow direction, flow speed, and/or static pressure of a fluid on, e.g. adjacent to the outer surface of, a car, a wind turbine or an aircraft, or in a wind tunnel.

The invention has mainly been described above with reference to a few embodiments. However, as is readily appreciated by a person skilled in the art, other embodiments than the ones disclosed above are equally possible within the scope of the invention, as defined by the appended patent claims.

For example, various features of the probes 10, 110, 210 been illustrated as being rotationally symmetric. This is not necessary; for example, the probe tip 12, channels 18, 20*a-d*, 24, 35, and body 28 may all have cross-sectional shapes other than a circular shape. In the claims, the word "comprising" does not exclude other elements or steps, and the indefinite article "a" or "an" does not exclude a plurality.

The invention claimed is:

1. A multi-hole pressure probe for measuring the pressure, flow speed, and/or flow direction of a fluid, the multi-hole pressure probe extending along a longitudinal axis and comprising:

a probe tip provided with a main channel inlet port facing in an upstream direction along the longitudinal axis, the probe tip having an outer probe tip surface adjacent to said main channel inlet port;

a main channel connected to said main channel inlet port, the main channel extending from the main channel inlet port in a downstream direction, opposite to the upstream direction, and being defined by a main channel inner wall;

a stagnation pressure probing port arranged within the main channel, downstream of the main channel inlet port, and facing the main channel inlet port in the upstream direction, the stagnation pressure probing port being connected to a stagnation pressure probing channel;

a set of side port arrangements in the outer probe tip surface, each of said side port arrangements being connected to a respective side port probing channel;

the main channel inner wall has a convergent section extending in the downstream direction from the main channel inlet port and a divergent section downstream of the convergent section;

at least one static pressure probing port connected to a static pressure probing channel, wherein said at least one static pressure probing port is arranged in the main channel between the main channel inlet port and the main channel outlet, for probing the static pressure in the main channel;

characterized in that the at least one static pressure probing port is arranged in the divergent section of the main channel.

2. The multi-hole pressure probe according to claim 1, wherein the outer probe tip surface tapers towards said main channel inlet port.

3. The multi-hole pressure probe according to claim 1, wherein the stagnation pressure probing port has a stagnation pressure probing port width, and a longitudinal distance from the main channel inlet port to the stagnation pressure probing port exceeds the stagnation pressure probing port width.

4. The multi-hole pressure probe according to claim 1, wherein the main channel inner wall has a parallel section between the convergent section and the divergent section.

5. The multi-hole pressure probe according to claim 4, further comprising an additional stagnation pressure probing port arranged at the parallel section.

6. The multi-hole pressure probe according to claim 1, wherein the convergent section flares in the upstream direction following a gradually increasing cone angle.

7. The multi-hole pressure probe according to claim 1, wherein the multi-hole pressure probe at the longitudinal position of the stagnation pressure probing port has an outer width of less than 10 mm.

8. The multi-hole pressure probe according to claim 1, wherein each of said side port arrangements comprises exactly one probing aperture.

9. The multi-hole pressure probe according to claim 1, wherein at least a portion of the stagnation pressure probing channel is defined by a cylindrical wall extending along the longitudinal axis to the stagnation pressure probing port.

10. The multi-hole pressure probe according to claim 1, further comprising at least one main channel outlet downstream of the main channel inlet port.

11. The multi-hole pressure probe according to claim 1, further comprising at least one static pressure probing port connected to a static pressure probing channel.

12. The multi-hole pressure probe according to claim 1, wherein the outer probe tip surface has a circular cross-section in a plane perpendicular to the longitudinal axis.

13. The multi-hole pressure probe according to claim 1, wherein the outer probe tip surface has the shape of a frustum of a pyramid or a circular cone.

14. The multi-hole pressure probe according to claim 1, the multi-hole pressure probe having a circular-cylindrical body extending downstream of the probe tip.

15. The multi-hole pressure probe according to claim 1, comprising a probe body extending along the longitudinal axis, and probe suspension arm extending from the probe body transversal to the longitudinal axis, the probe suspension arm comprising the probing channels.

16. The multi-hole pressure probe according to claim 1, wherein the multi-hole pressure probe is integrally formed as a single piece of material.

17. A method of determining a flow angle using a probe according to claim 1, comprising detecting a differential pressure between a first side port probing channel and at least one of the stagnation pressure probing channel and a second side port probing channel.

18. A method of determining a flow speed using a probe according to claim 1, comprising detecting a differential pressure between the stagnation pressure probing channel and a reference pressure source; and calculating the flow speed at least partly mainly based on the detected differential pressure.

19. The pressure probe according to claim 1, wherein the pressure probe determines the flow direction, flow speed, and/or pressure of a fluid in turbomachinery.

* * * * *